(12) United States Patent
Hasegawa et al.

(10) Patent No.: US 8,451,509 B2
(45) Date of Patent: May 28, 2013

(54) INFORMATION PROCESSING APPARATUS, INFORMATION PROCESSING METHOD, AND COMPUTER-READABLE STORAGE MEDIUM

(75) Inventors: Hiroyuki Hasegawa, Tokyo (JP); Michinori Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 12/405,151

(22) Filed: Mar. 16, 2009

(65) Prior Publication Data

US 2009/0237743 A1 Sep. 24, 2009

(30) Foreign Application Priority Data

Mar. 18, 2008 (JP) ................................. 2008-070402

(51) Int. Cl.
*H04N 1/40* (2006.01)
(52) U.S. Cl.
USPC .......................................... 358/448; 347/15
(58) Field of Classification Search
None
See application file for complete search history.

(56) References Cited

U.S. PATENT DOCUMENTS

| 2004/0179236 | A1* | 9/2004 | Ferlitsch et al. | 358/1.18 |
| 2005/0141880 | A1 | 6/2005 | Tsujii | |
| 2007/0019020 | A1* | 1/2007 | Wakai | 347/15 |

FOREIGN PATENT DOCUMENTS

| JP | 2005005886 A | | 1/2005 |
| JP | 2005327416 A | * | 11/2005 |
| JP | 2006-224665 A | | 8/2006 |
| JP | 2006224665 A | | 8/2006 |
| JP | 2007-272495 A | | 10/2007 |
| JP | 2009140603 A | | 6/2009 |

* cited by examiner

*Primary Examiner* — Twyler Haskins
*Assistant Examiner* — Christopher D Wait
(74) *Attorney, Agent, or Firm* — Canon U.S.A., Inc. IP Division

(57) ABSTRACT

When data of large capacity compared with the capacity of a recording medium used for storing a backup is divided into sections of data and backed up on recording media, a unit configured to divide data and generate sections of the data in order to record the data on recording media, the sections having an order, and a unit configured to generate representative images for each of the recording media, on which the sections of the data are recorded, are provided. Representative images assigned to a certain recording medium include a representative image generated using one of the sections of the data to be recorded on the certain recording medium and a representative image generated using at least one of a previous section and a next section of the data regarding the section of the data, whereby the relationship between the recording media can be easily recognized.

15 Claims, 18 Drawing Sheets

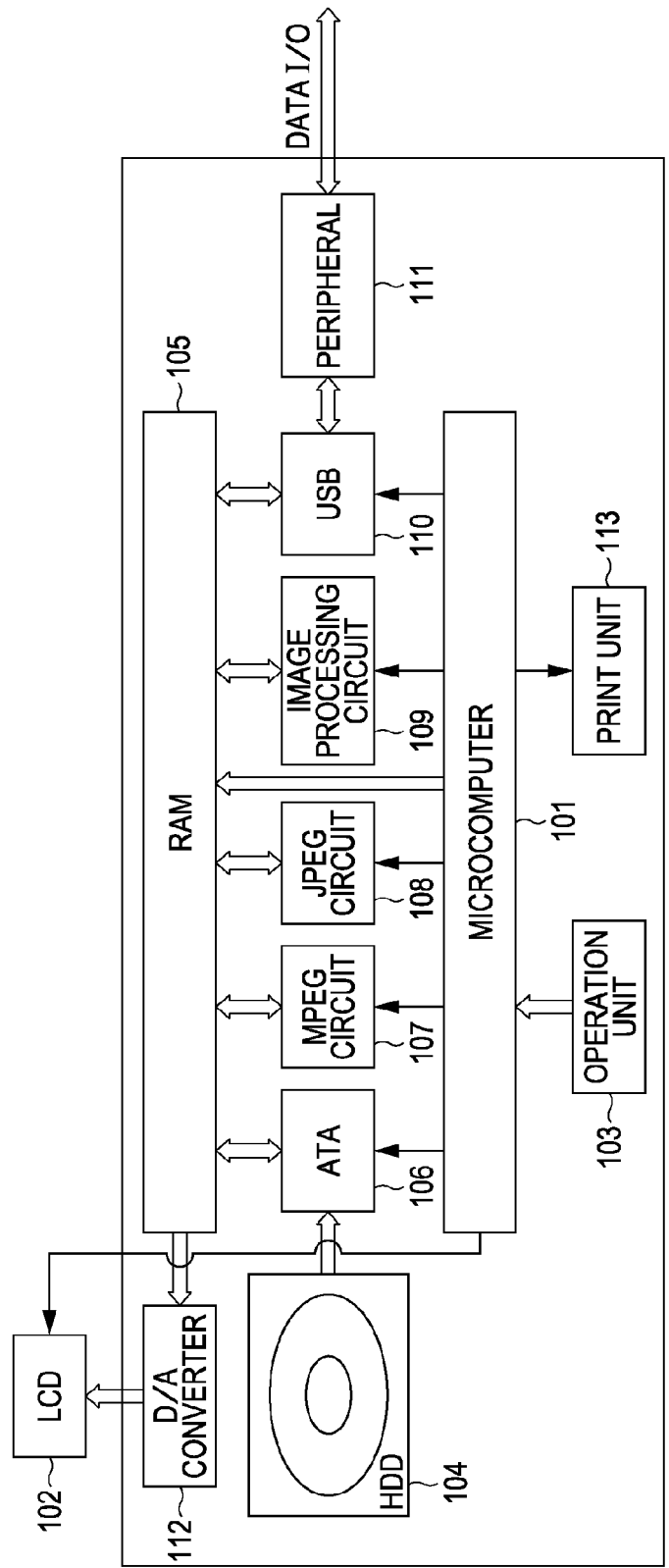

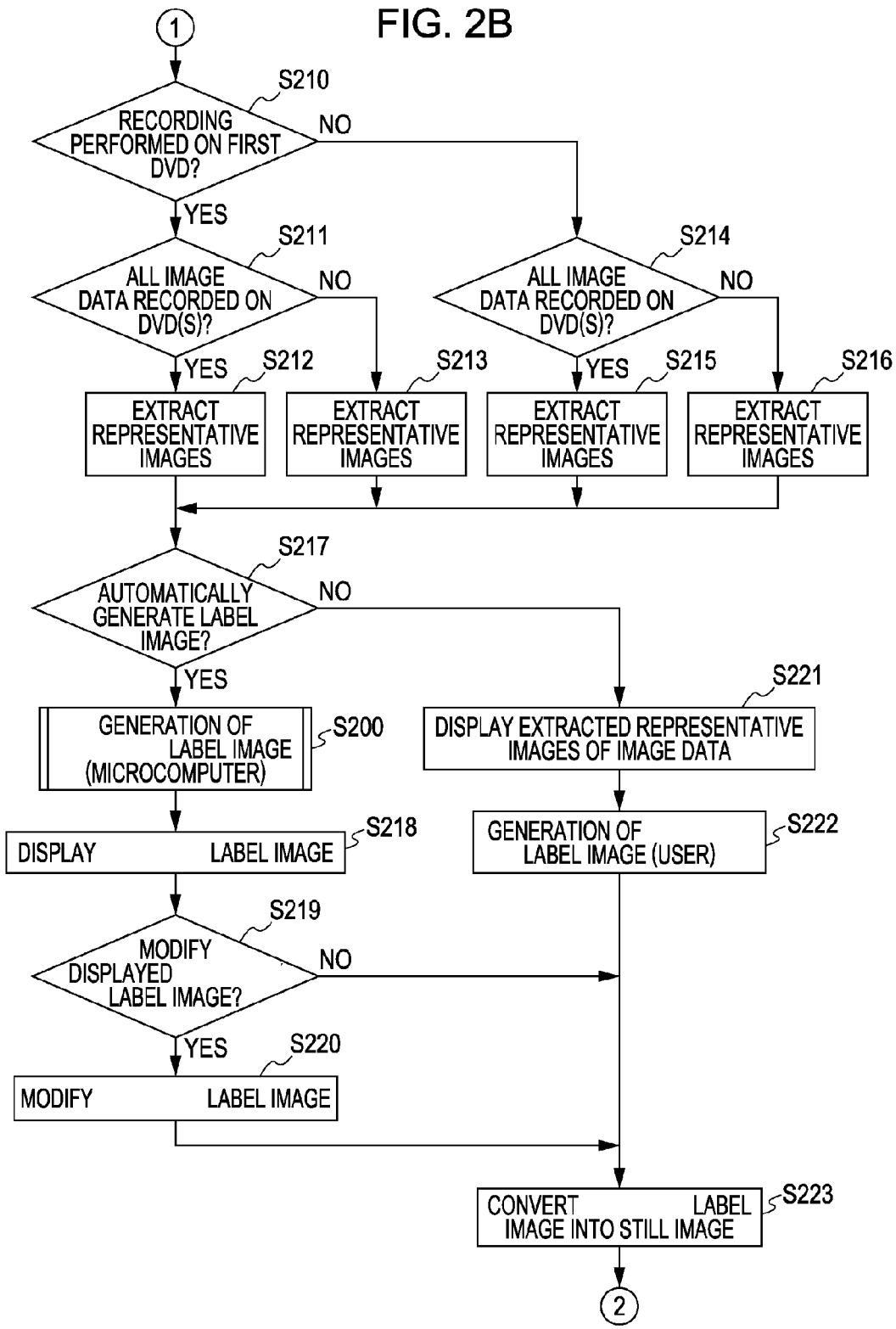

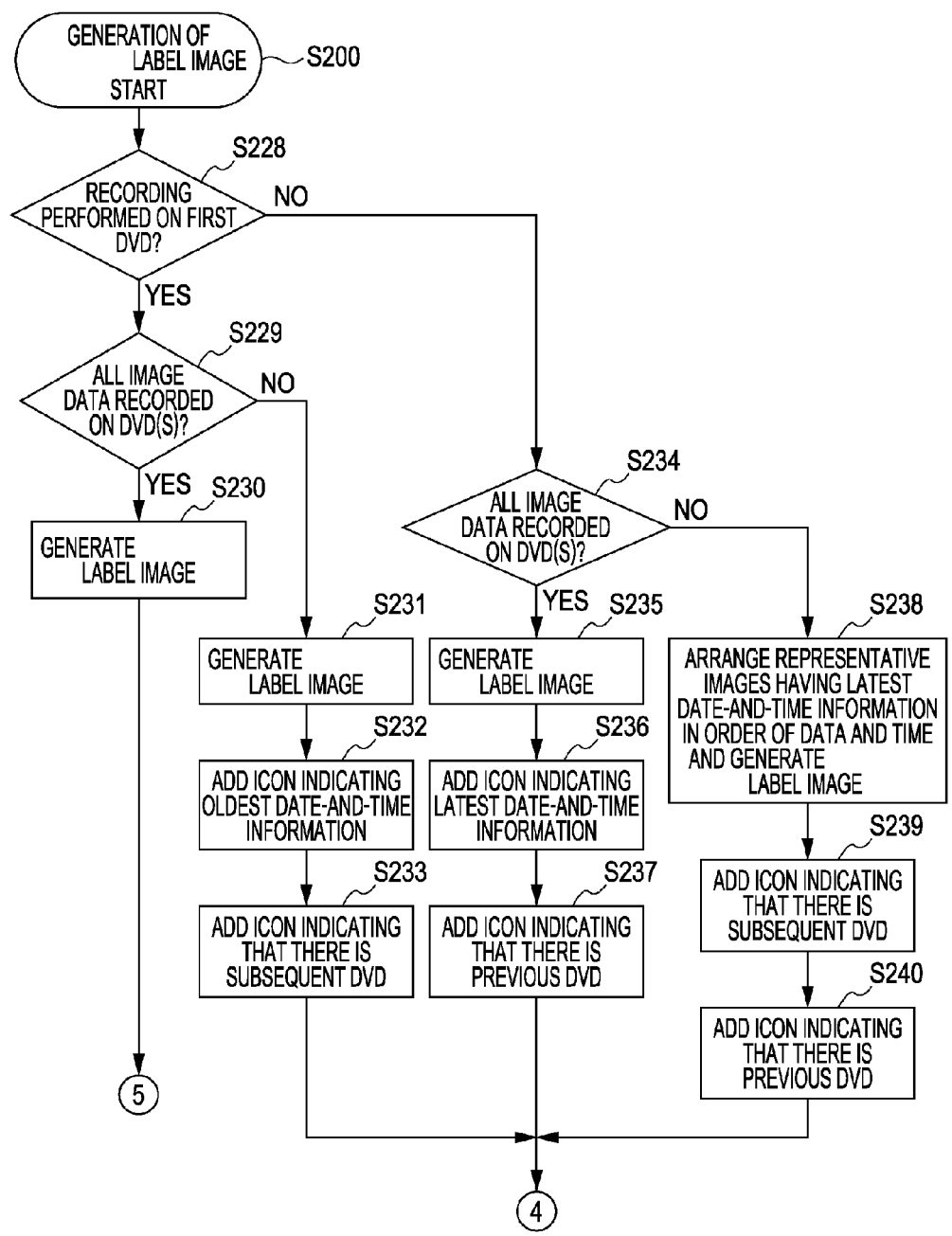

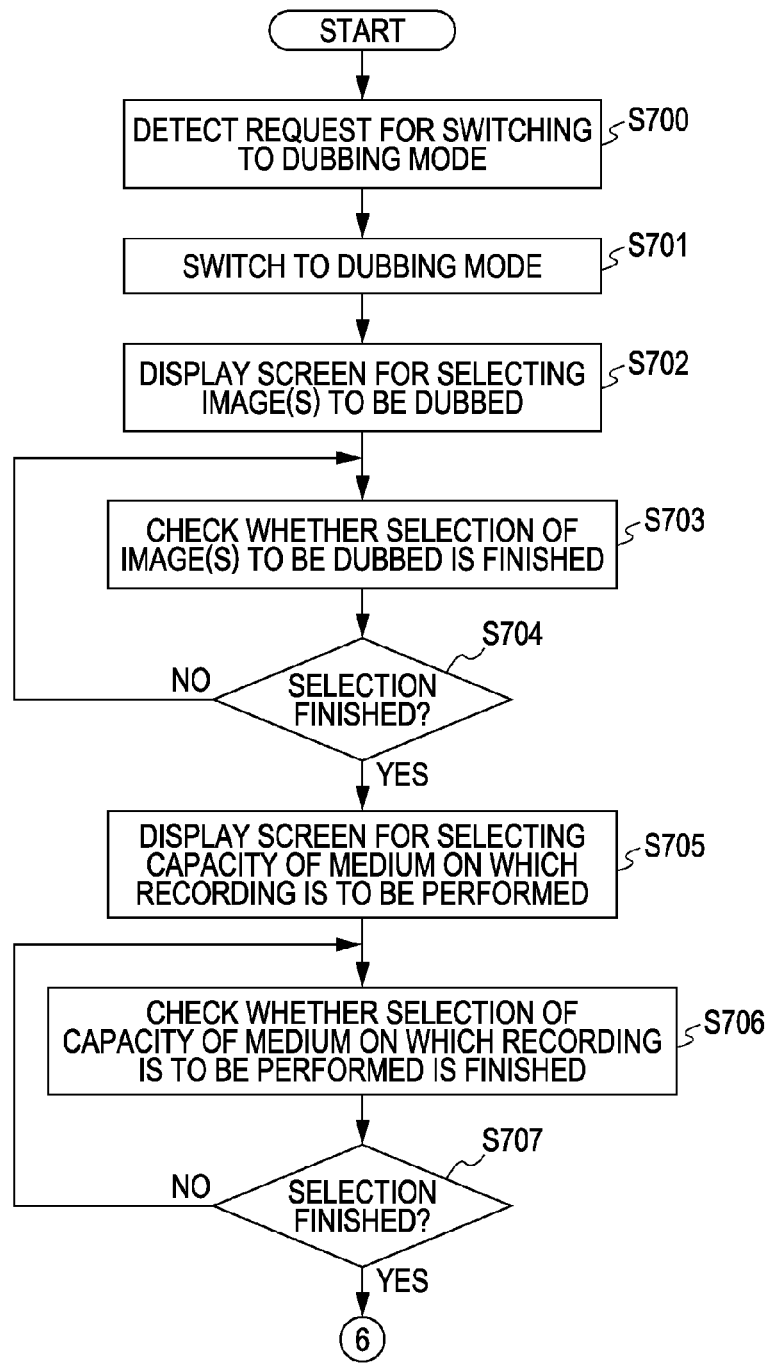

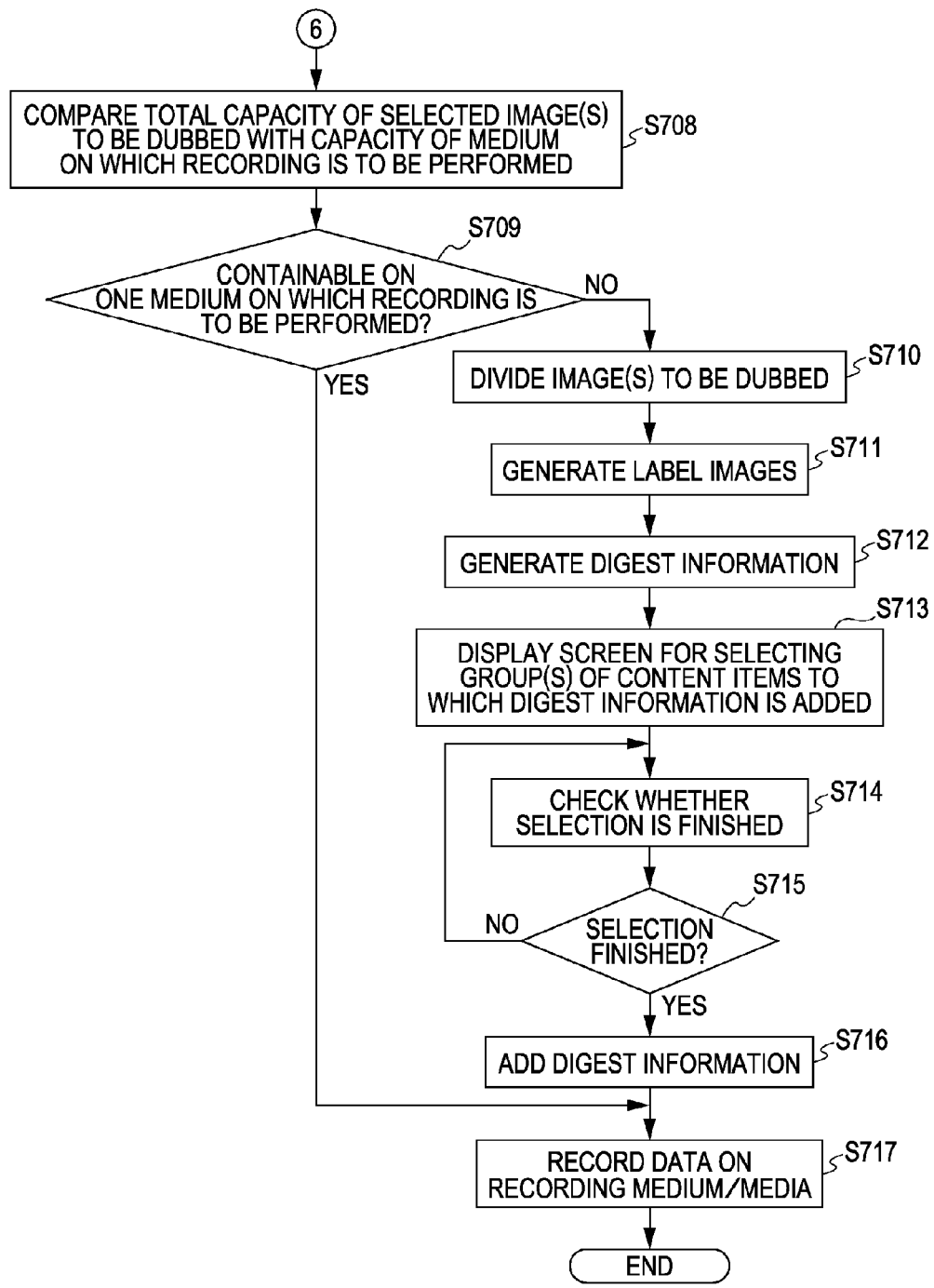

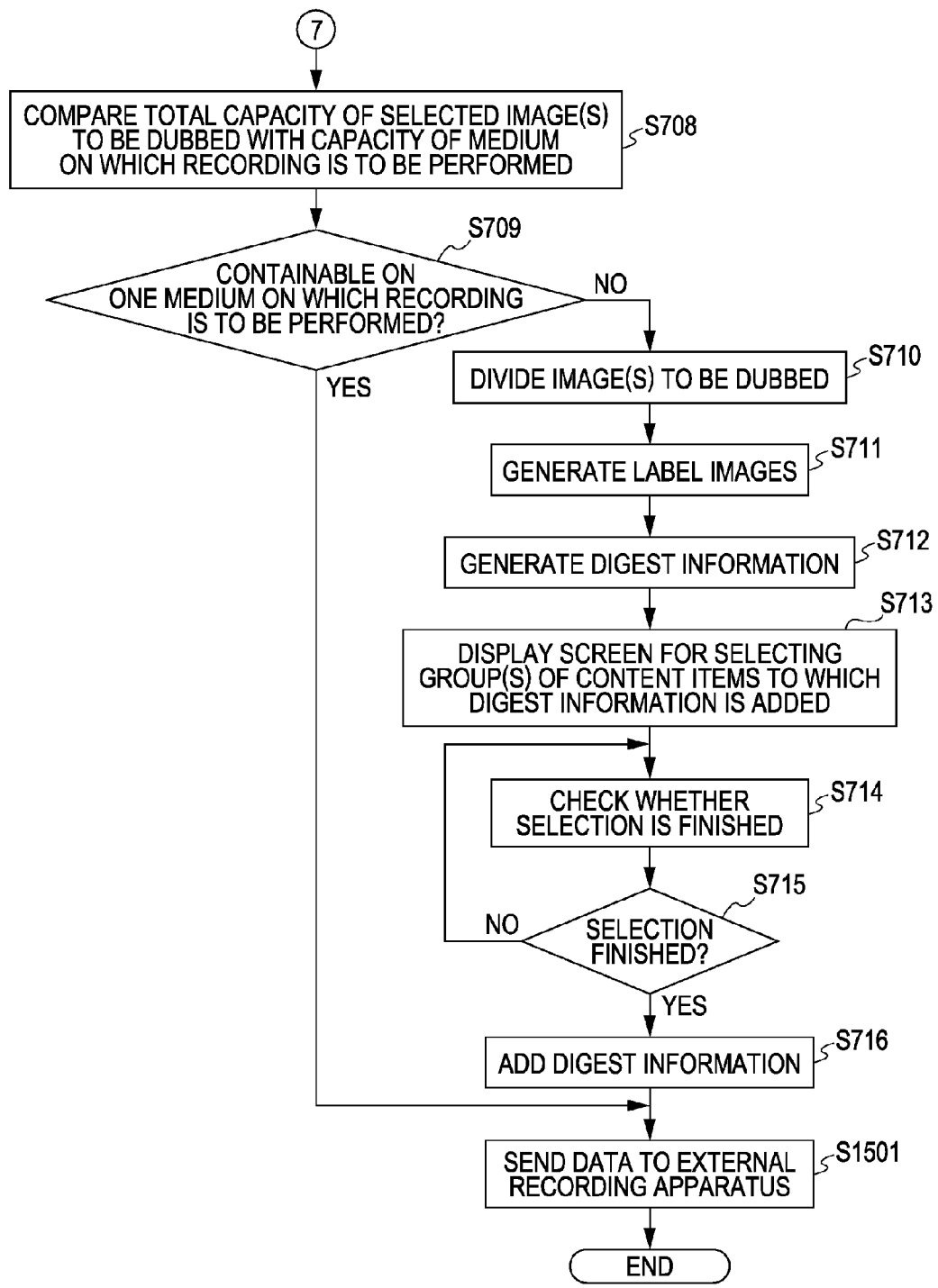

INFORMATION PROCESSING APPARATUS, INFORMATION PROCESSING METHOD, AND COMPUTER-READABLE STORAGE MEDIUM

BACKGROUND OF THE INVENTION

1. Field of the Invention

The present invention relates to an information processing apparatus that performs data processing in a case where data of large capacity compared with the capacity of recording media is divided into a plurality of sections of data and the sections of data are recorded on a plurality of recording media.

2. Description of the Related Art

As a method of generating a representative still image for each of strings of image data, the strings of image data recorded on a memory card are backed up on a recording medium such as a digital versatile disc (DVD). There is a method allowing a user to easily recognize what image data is stored on a recording medium by a method of printing, as a label, the contents of the backed-up strings of image data on a label surface of the recording medium such as a DVD (for example, see Japanese Patent Laid-Open No. 2006-224665).

A printing apparatus proposed in Japanese Patent Laid-Open No. 2006-224665 includes an image reading unit that reads image data recorded on a first recording medium which is removable from the printing apparatus, a back-up unit that backs up the read image data onto a second recording medium which is different from the first recording medium, and an index printing unit that prints an index sheet on which images each represented by the read image data are arranged in index order.

When image data is backed up in an external storage, in a case where there are a plurality of recording media for backup, the printing apparatus is designed to recognize which image data is stored on which recording medium.

Since hard disk drive (HDD) video cameras and Secure Digital (SD) cards of large capacity have become available, recording media (for example, an HDD and an SD card) attached to the main body of an image recording apparatus have a larger capacity than backup media (for example, DVDs). Thus, it becomes necessary to divide and record a group of image data within a recording medium attached to the main body of an image recording apparatus on a plurality of backup media.

In contrast, in the printing apparatus described in Japanese Patent Laid-Open No. 2006-224665, when a group of image data is divided and backed up on a plurality of backup media, there is a problem in that a user cannot recognize the relationship between the backup media.

SUMMARY OF THE INVENTION

An aspect of the present invention is to solve all of or at least one of the above-described problems.

Moreover, an aspect of the present invention is to provide an information processing apparatus including: a dividing unit configured to divide data and generate sections of the data in order to record the data on a plurality of recording media, the sections having an order; and a representative-image generation unit configured to generate representative images for each of the recording media, on which the sections of the data are recorded, wherein representative images assigned to a certain recording medium include a representative image generated using one of the sections of the data to be recorded on the certain recording medium and a representative image generated using at least one of a previous section of the data and a next section of the data regarding the section of the data.

Further features of the present invention will become apparent from the following description of exemplary embodiments with reference to the attached drawings.

BRIEF DESCRIPTION OF THE DRAWINGS

FIG. 1 is a block diagram showing a first embodiment and showing an exemplary structure of a still-image generation apparatus for realizing a still-image generation method.

FIG. 2B is a flowchart showing the first embodiment and illustrating the exemplary processing procedure of the still-image generation apparatus for realizing the still-image generation method.

FIG. 2D is a flowchart showing the first embodiment and illustrating the exemplary processing procedure of the still-image generation apparatus for realizing the still-image generation method.

FIG. 7A is a flowchart showing the second embodiment and illustrating a procedure in which digest information regarding a group of content items to be dubbed is generated at the time of dubbing and the digest information is recorded for another group of content items.

FIG. 7B is a flowchart showing the second embodiment and illustrating the procedure in which digest information regarding a group of content items to be dubbed is generated at the time of dubbing and the digest information is recorded for another group of content items.

FIG. 15B is a flowchart showing the third embodiment and illustrating the procedure in which digest information regarding a group of content items to be dubbed is generated at the time of dubbing and the digest information is recorded for another group of content items.

DESCRIPTION OF THE EMBODIMENTS

Figure 2A:
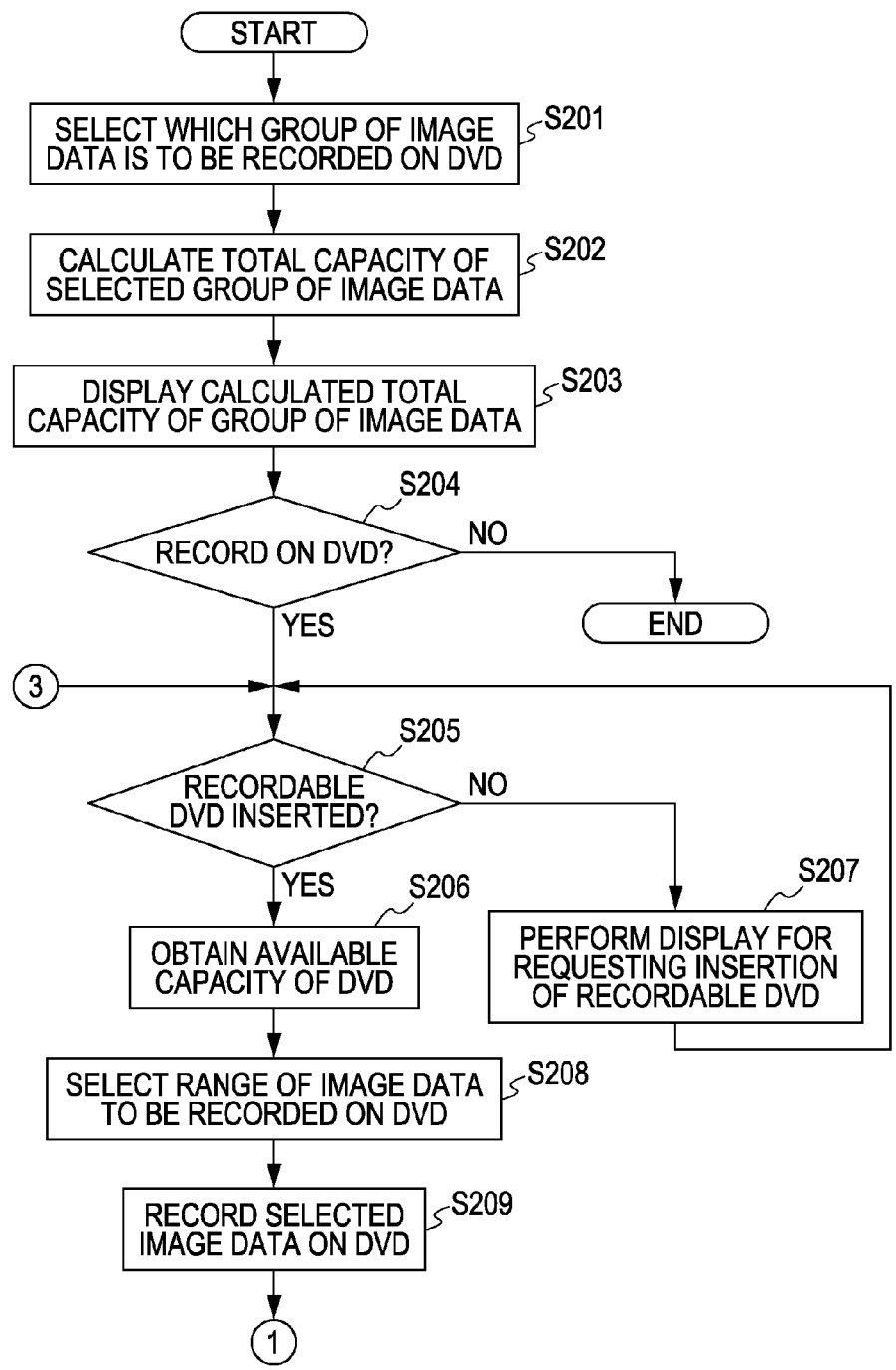
FIG. 2A is a flowchart showing the first embodiment and illustrating an exemplary processing procedure of the still-image generation apparatus for realizing the still-image generation method.
Figure 2C:
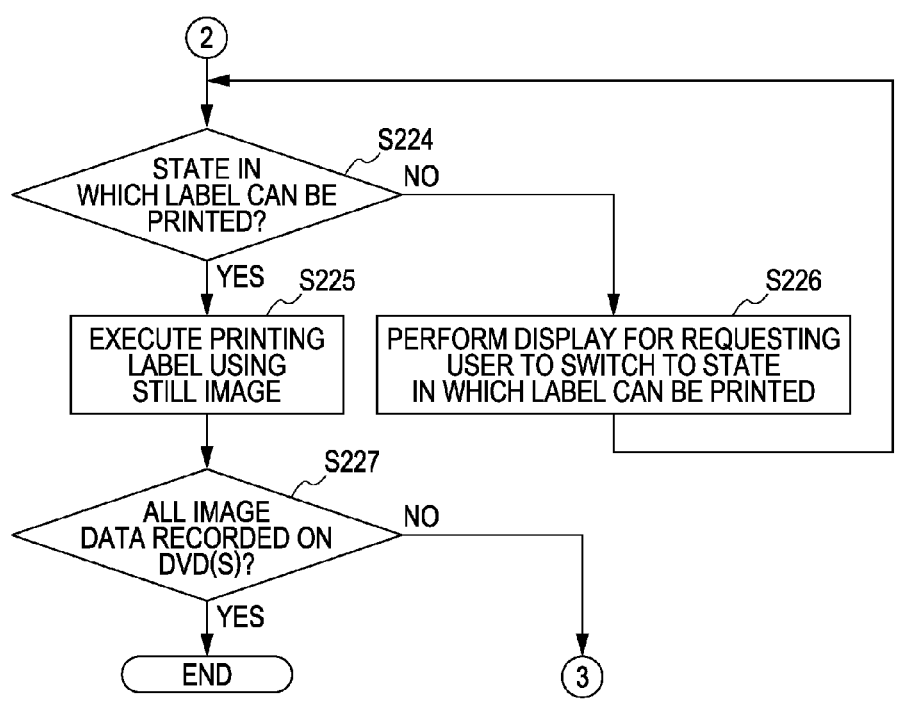
FIG. 2C is a flowchart showing the first embodiment and illustrating the exemplary processing procedure of the still-image generation apparatus for realizing the still-image generation method.

FIG. 1 is a block diagram showing an example of an internal structure of an information processing apparatus according to a first embodiment of the present invention. As shown in FIG. 1, a still-image generation apparatus according to the first embodiment includes a microcomputer 101, a liquid crystal display (LCD) 102, an operation unit 103, an HDD 104, a random-access memory (RAM) 105, an AT attachment (ATA) 106, an MPEG circuit 107, and a JPEG circuit 108. Moreover, the still-image generation apparatus includes an image processing circuit 109, a universal serial bus (USB) 110, a peripheral 111, and a digital-to-analog (D/A) converter 112.

The microcomputer 101 is a microcomputer for performing system control of the still-image generation apparatus. In addition to the system control, the microcomputer 101 outputs, to the RAM 105, a signal used for display (hereinafter referred to as an OSD signal) for displaying information to a user via display performed on the LCD 102.

The LCD 102 displays image data, an OSD signal, and the like on which digital-to-analog conversion has been performed by the D/A converter 112, in accordance with an instruction from the microcomputer 101. Such image data, an OSD signal, and the like are loaded in the RAM 105.

The operation unit 103 receives a user operation and outputs it to the microcomputer 101. Time information is added to image data. In general, time information is information regarding date and time; however, regarding moving-image data, time information may be a time stamp. The image data is divided into recording units of data (sections of data), and the sections of data are stored in the HDD 104 in accordance with the order of date and time while maintaining the order. The RAM 105 has a plurality of areas for holding data, for example, a label-image generation area, a label-image area, a representative-image storage area, an OSD-signal area, a data-output area, and the like.

A plurality of representative images for generating a label image are stored in the label-image generation area. Label images are stored in the label-image area. Representative images which correspond to the sections of the image data are stored in the representative-image storage area. The OSD-signal area is an area for outputting, to the LCD 102, OSD data as an OSD signal, the OSD data being stored in the OSD-signal area by the microcomputer 101. The data-output area is an area used when image data within the HDD 104 is output to the peripheral 111.

The ATA 106 transfers, to the RAM 105, image data and data used to generate a representative image (hereinafter referred to as representative-image generation-use data) of image data stored in the HDD 104, in accordance with an instruction from the microcomputer 101. The representative-image generation-use data is thumbnail data within an exchangeable image file format (exif) of image data when the image data is still-image data, and is an I picture at a predetermined position when the image data is moving-image data.

The MPEG circuit 107 decodes and encodes moving-image data loaded in the RAM 105 in accordance with an instruction from the microcomputer 101, and generates digest data. As digest data, a moving image is generated. In this case, the digest data is generated by, for example, combining items of data that are extracted at predetermined time intervals from information to be recorded on a medium. The digest data is not limited thereto, and can be generated by combining items of data, each of which is an item of data of a few seconds from the beginning of a corresponding one of scenes obtained by performing scene detection. The JPEG circuit 108 decodes and encodes still-image data loaded in the RAM 105 in accordance with an instruction from the microcomputer 101, and generates still images as digest data. In this case, when still images are arranged in the order of file name or time, the still images to be the digest data may be extracted at predetermined intervals or randomly.

The image processing circuit 109 performs image processing on image data and representative images loaded in the RAM 105 in accordance with an instruction from the microcomputer 101. Examples of the image processing are resizing (reduction), addition of an icon, and the like. The USB 110 outputs data loaded in the RAM 105 to the peripheral 111 in accordance with an instruction from the microcomputer 101. Moreover, the USB 110 transfers, to the RAM 105, data input from the peripheral 111. The peripheral 111 is a data input/output interface for inputting/outputting data from and to the outside of the still-image generation apparatus. The D/A converter 112 converts image data and OSD data loaded in the OSD-signal area of the RAM 105 into an analog signal, and outputs the analog signal to the LCD 102.

FIGS. 2A through 2E are flowcharts in a case where the still-image generation apparatus shown in FIG. 1 records image data stored in the HDD 104 on a DVD which is outside the still-image generation apparatus and connected via the peripheral 111. Moreover, FIGS. 2A through 2E are flowcharts for illustrating an exemplary processing procedure whose last processing is printing of a label image generated by the still-image generation apparatus of FIG. 1 on the label surface of a DVD which is outside the still-image generation apparatus and connected via the peripheral 111. Here, description will be made by treating an external device connected to the still-image generation apparatus as a multifunction device that has both of a function of recording data on a DVD and a function of printing a label on a surface of a DVD.

That is, both of data to be recorded on a DVD and print data to be printed as a label on a surface of a DVD are sent to an external device via the peripheral 111. Here, the external device is not limited to such a multifunction device and it may be realized by the combination of an apparatus for recoding data and an apparatus for printing. In this case, a plurality of communication interfaces should be used to communicate with a recording apparatus for recording data and a printer. Here, in the following description, processing in each step will be performed in accordance with control performed by the microcomputer 101.

First, before step S201, the microcomputer 101 controls the ATA 106 so as to transfer representative-image generation-use data of the image data recorded in the HDD 104 to the representative-image storage area of the RAM 105 (this step is not shown). Thereafter, the representative-image generation-use data is decoded by the JPEG circuit 108 when the image data is still-image data, resized by the image processing circuit 109, and then stored in the representative-image storage area. Moreover, when the image data is moving image data, the image data is decoded by the MPEG circuit 107 and resized by the image processing circuit 109, and then representative images are generated and stored in the representative-image storage area.

In step S201, the microcomputer 101 transfers, to the RAM 105, an OSD signal indicating which image data is to be recorded on a DVD from among the image data recorded on the HDD 104. Furthermore, the microcomputer 101 controls the image processing circuit 109 so as to mix representative images of the image data and the OSD signal. The mixed image signal is converted by the D/A converter 112 into an analog signal and the analog signal is output to the LCD 102. A user operates the operation unit 103 and selects a group of image data to be recorded on the DVD from the HDD 104 while checking the representative images displayed on the LCD 102. Thereafter, the procedure proceeds to step S202.

In step S202, the microcomputer 101 controls the ATA 106 and calculates the total capacity of the group of the image data selected by a user in step S201. Thereafter, the procedure proceeds to step S203. In step S203, the microcomputer 101 outputs an OSD signal indicating the total capacity of the group of the image data obtained in step S202 to the OSD-signal area of the RAM 105. The OSD signal output to the RAM 105 is converted by the D/A converter 112 into an analog signal and the analog signal is output to the LCD 102. Thereafter, the procedure proceeds to step S204.

In step S204, the microcomputer 101 outputs an OSD signal indicating whether the group of the image data selected in step S201 should be recorded on DVD, to the OSD-signal area of the RAM 105. The OSD signal output to the RAM 105 is converted by the D/A converter 112 into an analog signal and the analog signal is output to the LCD 102. Here, if YES is selected in step S204, the procedure proceeds to step S205. If NO is selected in step S204, the procedure is finished.

In step S205, the microcomputer 101 controls the USB 110 and determines whether a DVD (not shown) which is an external medium connected to the peripheral 111 is recordable. As a result of this determination, if the microcomputer 101 determines that the DVD is recordable, the procedure proceeds to step S206. If the microcomputer 101 determines that the DVD is not recordable, the procedure proceeds to step S207.

In step S206, the microcomputer 101 controls the USB 110, and obtains the available capacity of the DVD, which is an external medium connected to the peripheral 111. Here, the still-image generation apparatus may be configured in such a manner that the available capacity of the DVD is manually input by a user using the operation unit 103. Thereafter, the procedure proceeds to step S208.

In step S207, the microcomputer 101 outputs, to the OSD-signal area of the RAM 105, an OSD signal indicating that a recordable DVD is required to be connected. The OSD signal output to the RAM 105 is converted by the D/A converter 112 into an analog signal and the analog signal is output to the LCD 102. Thereafter, the procedure proceeds to step S208.

In step S208, the microcomputer 101 selects items of the image data to be recorded on the DVD from among the group of the image data selected in step S201 on the basis of the available capacity of the DVD obtained in step S206. Here, images for the available capacity of the DVD are automatically selected from among the group of the image data selected in step S201 but not yet been recorded on a DVD, from the oldest image data in the order of time information. The selected items of the image data are arranged in the order of time information from the oldest image data and are output to the LCD 102. Here, items of the image data for the available capacity of a DVD may be manually selected by a user.

Thus, the sections of the image data that are obtained by dividing the group of the image data selected in step S201 are generated with the order in accordance with the time information. Although description will be made later, generation of representative images is performed using the selected group of the image data. In this generation of representative images, the representative images assigned to a recording medium should include a representative image regarding the image data to be recorded on a previous or next recording medium according to the order of the sections of the image data. That is, the image data immediately before or after the selected section of the image data is used from among the sections of the image data that are not selected in step S208. Moreover, this "immediately before or after" does not have to mean absolutely immediately before or after the selected section of the image data. That is, from among the sections of the image data that are not selected in step S208, the image data almost immediately before or after the selected section of the image data may be used.

Next, in step S209, the microcomputer 101 controls the ATA 106 so as to transfer the section of the image data selected in step S208 from the HDD 104 to the data-output area of the RAM 105. Thereafter, the microcomputer 101 controls the USB 110 and writes the data transferred to the data-output area of the RAM 105 into the DVD via the peripheral 111. Thereafter, the procedure proceeds to step S210.

In step S210, the microcomputer 101 determines whether the section of the image data selected in step S208 is recorded on the first DVD or on a DVD that is not the first DVD. As a result of this determination, if the microcomputer 101 determines that the section of the image data selected in step S208 is recorded on the first DVD, the procedure proceeds to step S211. If the microcomputer 101 determines that the section of the image data selected in step S208 is recorded on the second or later DVD, the procedure proceeds to step S214.

In step S211, the microcomputer 101 determines whether all the image data selected in step S201 has been recorded on a DVD/DVDs. As a result of this determination, if YES is selected, the procedure proceeds to step S212, and if NO is selected, the procedure proceeds to step S213.

In step S212, the microcomputer 101 controls the ATA 106 so as to transfer the representative-image generation-use data of the image data recorded on the current DVD from the HDD 104 to the label-image generation area of the RAM 105. If the image data is still-image data, the representative-image generation-use data is decoded by the JPEG circuit 108 and thereafter resized by the image processing circuit 109, and then stored in the label-image generation area. If the image data is moving-image data, the representative-image generation-use data is decoded by the MPEG circuit 107 and thereafter resized by the image processing circuit 109, whereby representative images are obtained. Then, the representative images are stored in the label-image generation area. Thereafter, the procedure proceeds to step S217.

In step S213, the microcomputer 101 controls the ATA 106 so as to transfer the representative images of the image data recorded on the current DVD and the representative-image generation-use data of a section of the image data that has not been recorded, from the HDD 104 to the label-image generation area of the RAM 105. If the image data is still-image data, the representative-image generation-use data is decoded by the JPEG circuit 108 and thereafter resized by the image processing circuit 109, and then stored in the label-image generation area. If the image data is moving-image data, the representative-image generation-use data is decoded by the MPEG circuit 107 and resized by the image processing circuit 109, whereby a representative image is obtained. Then, the representative image is stored in the label-image generation area. Thereafter, the procedure proceeds to step S217.

In step S214, the microcomputer 101 determines whether all the image data selected in step S201 has been recorded on a DVD/DVDs. As a result of this determination, if YES is selected, the procedure proceeds to step S215, and if NO is selected, the procedure proceeds to step S216.

In step S215, the microcomputer 101 controls the ATA 106 so as to transfer a representative image of the image data recorded on the previous DVD and the representative-image generation-use data of the image data recorded on the current DVD from the HDD 104 to the label-image generation area of the RAM 105. When the image data is still-image data, the representative-image generation-use data is decoded by the JPEG circuit 108 and thereafter resized by the image processing circuit 109, and then stored in the label-image generation area. If the image data is moving-image data, the representative-image generation-use data is decoded by the MPEG circuit 107 and thereafter resized by the image processing circuit 109, whereby representative images are obtained. Then, the representative images are stored in the label-image generation area. Thereafter, the procedure proceeds to step S217.

In step S216, the microcomputer 101 controls the ATA 106 so as to transfer a representative image of the image data recorded on the previous DVD, the representative images of the image data recorded on the current DVD, and the representative-image generation-use data of a section of the image data that has not yet been recorded, from the HDD 104 to the label-image generation area of the RAM 105. If the image data is still-image data, the representative-image generation-use data is decoded by the JPEG circuit 108 and thereafter resized by the image processing circuit 109, and then stored in the label-image generation area. If the image data is moving-image data, the representative-image generation-use data is decoded by the MPEG circuit 107 and thereafter resized by the image processing circuit 109, whereby a representative image is obtained. Then, the representative image is stored in the label-image generation area. Thereafter, the procedure proceeds to step S217.

Here, the above-described representative images are not generated by performing reduction processing on all items of the image data, but are generated by extracting a predetermined number of images for each recording medium and by reducing the images for the recording medium. For example, even when 100 still images or 1000 still images are recorded on a certain recording medium, if the number of representative images used in a label of the recording medium is five, five images are extracted in accordance with a predetermined rule.

Representative images may be extracted at intervals of a predetermined number of images when images are arranged in the order of time information or a user may manually select representative images. Moreover, five images whose image properties tend to be different from each other may be extracted in accordance with the analysis of image information. Moreover, representative images may be extracted in such a manner that they are as different as possible by referring to other property information such as capturing-scene information or GPS position information. Here, the number of representative images for each recording medium may be fixed for a function of generating a label image, the number of representative images may be determined for each type of recording medium, or the number of representative images may be manually determined by a user.

In a case where moving-image data is recorded, a still image may be extracted as a representative image every predetermined time period, a scene at which between different capturing scene changes may be used as a representative image, or a user may manually select a representative image.

In step S217, the microcomputer 101 outputs, to the OSD-signal area of the RAM 105, an OSD signal indicating whether a label image should be automatically generated. The OSD signal output to the RAM 105 is converted by the D/A converter 112 into an analog signal and the analog signal is output to the LCD 102. The procedure stops in step S217 until a selection is made as to whether a label image should be automatically generated. As a result of this, if YES is selected, the procedure proceeds to step S200, and if NO is selected, the procedure proceeds to step S221. In step S200, processing for generating a label image is performed. The processing procedure thereof will be described later. After the label image is generated in step S200, the procedure proceeds to step S218.

In step S218, the microcomputer 101 causes the D/A converter 112 to convert the label image stored in the label-image area of the RAM 105 into an analog signal, and the analog signal is output to the LCD 102.

In step S219, the microcomputer 101 outputs, to the OSD-signal area of the RAM 105, an OSD signal indicating whether the label image displayed in step S218 should be modified. The OSD signal output to the RAM 105 is converted by the D/A converter 112 into an analog signal, and the analog signal is output to the LCD 102. In step S219, if YES is selected, the procedure proceeds to step S220, and if NO is selected, the procedure proceeds to step S223.

In step S220, the microcomputer 101 causes the D/A converter 112 to convert the representative images stored in the label-image generation area of the RAM 105 and the label image stored in the label-image area of the RAM 105 into an analog signal, and the analog signal is output to the LCD 102. A user operates the operation unit 103 and modifies the label image. The label image modified by the user is stored in the label-image area. Thereafter, the procedure proceeds to step S223.

In contrast, if the procedure proceeds from step S217 to step S221, the microcomputer 101 causes the D/A converter 112 to convert the representative images stored n the label-image generation area of the RAM 105 into an analog signal and the analog signal is output to and displayed on the LCD 102. Thereafter, the procedure proceeds to step S222.

In step S222, a user generates a label image from the representative images displayed in step S221 by operating the operation unit 103. The label image generated by the user is stored in the label-image area. Thereafter, the procedure proceeds to step S223.

In step S223, the microcomputer 101 controls the image processing circuit 109 and converts the size of the label image stored in the label-image area of the RAM 105 into the size which is writable on the label surface of the DVD. Thereafter, the microcomputer 101 controls the JPEG circuit 108 so as to convert, into a still image, the label image whose size has been converted into the size writable on the label surface of the DVD. Thereafter, the procedure proceeds to step S224.

In step S224, the microcomputer 101 controls the USB 110 and determines whether the DVD, which is an external medium connected to the peripheral 111, is in a state in which a label can be printed. As a result of this determination, if the microcomputer 101 determines that the DVD is in the state in which a label can be printed, the procedure proceeds to step S225. If the microcomputer 101 determines that the DVD is not in the state in which a label can be printed, the procedure proceeds to step S226.

In step S225, the microcomputer 101 controls the USB 110, generates print data for printing a label from the still image generated in step S223, and prints the generated print data on the label surface of the DVD. Printing is performed by a print unit 113. Thereafter, the procedure proceeds to step S227.

Moreover, in step S226, the microcomputer 101 outputs an OSD signal indicating a request to switch to the state in which a label can be printed, to the OSD-signal area of the RAM 105. The OSD signal output to the RAM 105 is converted by the D/A converter 112 into an analog signal, and the analog signal is output to and displayed on the LCD 102. Thereafter, the procedure returns to step S224 and processing described above is repeatedly performed.

In step S227, the microcomputer 101 determines whether all the image data selected in step S201 has been recorded on a DVD/DVDs. As a result of this determination in step S227, if YES is selected, the procedure is completed, and if NO is selected, the procedure returns to step S205 and processing described above is repeatedly performed.

Next, processing of generating a label image will be described, which is performed in step S200. Step S228 is the first step after processing starts in step S200. In step S228, the microcomputer 101 determines whether the section of the image data selected in step S208 is recorded on the first DVD or recorded on the second or later DVD. As a result of this determination, if the microcomputer 101 determines that recording is performed on the first DVD, the procedure proceeds to step S229. If the microcomputer 101 determines that recording is performed on the second or later DVD, the procedure proceeds to step S234.

In step S229, the microcomputer 101 determines whether all the image data selected in step S201 has been recorded on a DVD/DVDs. As a result of this determination, if YES is selected, the procedure proceeds to step S230, and if NO is selected, the procedure proceeds to step S231.

In step S230, the microcomputer 101 arranges the representative images stored in the label-image generation area of the RAM 105 in the order of time information regarding the image data, generates a label image, and stores the label image in the label-image area of the RAM 105. Thereafter, the procedure proceeds to step S218 as described above.

In contrast, if the procedure proceeds from step S229 to step S231, the microcomputer 101 performs processing of generating a label image using the representative images stored in the label-image generation area. Furthermore, in this processing, a label image is generated using the representative images of the image data recorded on the current DVD and a representative image of the image data that should be recorded on another recording medium (another DVD in this case). These representative images are arranged in the order of date and time utilizing the time information that the original image data has, and a label image is generated. The label image is stored in the label-image area. Thereafter, the procedure proceeds to step S232.

In step S232, in order to generate a label image, the microcomputer 101 controls the image processing circuit 109 so as to perform processing on a representative image stored in the label-image area of the RAM 105. In this processing, an icon indicating the oldest time information regarding the group of the image data selected in step S201 is added to the representative image having the oldest time information from among the representative images recorded on the current DVD. Thereafter, the procedure proceeds to step S233.

In step S233, the microcomputer 101 controls the image processing circuit 109 and selects the representative image having the oldest time information from among the representative images generated from a section of the image data that has not been recorded on a DVD. Furthermore, an icon indicating that there is a subsequent DVD (here, the number of the next disc) is added to the representative image having the oldest time information. Thereafter, the procedure proceeds to step S241.

In step S234, the microcomputer 101 determines whether all the image data selected in step S201 has been recorded on a DVD/DVDs. As a result of this determination, if YES is selected, the procedure proceeds to step S235, and if NO is selected, the procedure proceeds to step S238.

In step S235, the microcomputer 101 performs processing of generating a label image using the representative images stored in the label-image generation area of the RAM 105. In this processing, the representative images of the image data recorded on the current DVD and the representative image having the latest time information from among the representative images of the image data recorded on the previous DVD are arranged in the order of date and time, and a label image is generated. The label image is stored in the label-image area. Thereafter, the procedure proceeds to step S236.

In step S236, the microcomputer 101 controls the image processing circuit 109 and performs the following processing on a representative image stored in the label-image area of the RAM 105. That is, a predetermined differentiation icon (for example, an End mark) indicating the latest time information is added to the representative image having the latest time information from among the representative images of the image data recorded on the current DVD. From this icon, it can be recognized that the last image of a series of images selected in step S201 has been recorded on the recording medium. Thereafter, the procedure proceeds to step S237.

In step S237, the microcomputer 101 controls the image processing circuit 109 and performs the following processing on a representative image stored in the label-image area of the RAM 105. That is, the representative image having the latest time information from among the representative images of the image data recorded on the previous DVD is added to a label image. Furthermore, an icon indicating that there is a previous DVD related to the current DVD (the previous disc number or the like) is added. In a case where the image data is divided into three and recorded on three discs, the last disc number is 3. In this step, the previous DVD number is 2 and information such as Disc 2 is added to the representative image. Thereafter, the procedure proceeds to step S241.

In step S238, the microcomputer 101 performs the following processing on a representative image stored in the label-image area of the RAM 105. That is, the representative images of the image data recorded on the current DVD, the representative image having the latest time information from among the representative images of the image data recorded on the previous DVD, and the representative image having the oldest time information from among the representative images of the image data to be recorded on the next DVD are arranged in the order of date and time. A label image is generated and it is stored in the label-image area. Thereafter, the procedure proceeds to step S239.

In step S239, the microcomputer 101 controls the image processing circuit 109. Then, an icon indicating that there is a next DVD is added to the representative image having the oldest time information from among the representative images of the image data to be recorded on the next DVD. In this case, the next disc number is added. Thereafter, the procedure proceeds to step S240.

In step S240, the microcomputer 101 controls the image processing circuit 109, and adds an icon indicating that there is a previous DVD to the representative image having the latest time information from among the representative images of the image data recorded on the previous DVD. In this case, the previous disc number is added. Thereafter, the procedure proceeds to step S241.

In step S241, the microcomputer 101 outputs, to the OSD-signal area of the RAM 105, an OSD signal indicating whether the representative image of the image data that is not recorded on the current DVD but on the previous DVD or the representative image of the image data that is not recorded on the current DVD but to be recorded on the next DVD should be differentiated from the representative images of the image data recorded on the current DVD. The OSD signal output to the RAM 105 is converted into an analog signal by the D/A converter 112 and the analog signal is output to the LCD 102. In step S242, if YES is selected, the procedure proceeds to step S243. If NO is selected, the procedure proceeds to step S244.

In step S242, the microcomputer 101 outputs, to the OSD-signal area of the RAM 105, an OSD signal indicating whether differentiation should be performed by representative-image size. The OSD signal output to the RAM 105 is converted into an analog signal by the D/A converter 112, and the analog signal is output to and displayed on the LCD 102. In step S242, if YES is selected, the procedure proceeds to step S243. If NO is selected, the procedure proceeds to step S244.

In step S243, the representative image of the image data that is recorded on the previous DVD or the representative image of the image data that is to be recorded on the next DVD is resized to be smaller than the representative images of the image data recorded on the current DVD. Thereafter, the procedure proceeds to step S218.

In step S244, the microcomputer 101 controls the image processing circuit 109 so as to add an icon indicating a representative image of the image data recorded on the current DVD to each of the representative images of the image data recorded on the current DVD. For example, "OK" mark can be used as the icon. Thereafter, the procedure proceeds to step S245.

In step S245, the microcomputer 101 controls the image processing circuit 109 so as to add a predetermined icon to the representative image that is recorded on the previous DVD or the representative image that is to be recorded on the next DVD. For example, "NG" mark can be used as the icon. The icons in steps S244 and S245 are not limited thereto and may be changed as needed, as long as they are helpful to know whether the data corresponding to each of the representative images shown on the label image is recorded on the current DVD. Thereafter, the procedure proceeds to step S218. Here, in steps S242 and S243, differentiation is performed by reduction processing, whereby it is easily recognized whether an image has been recorded or is to be recorded on a different recording medium; however, processing for differentiation is not limited to reduction processing. For example, the color tone or density may be changed (for example, the representative image of the image data recorded on the previous DVD or the representative image of the image data to be recorded on the next DVD may be dimly displayed on the label image of the current DVD).

Figure 2E:
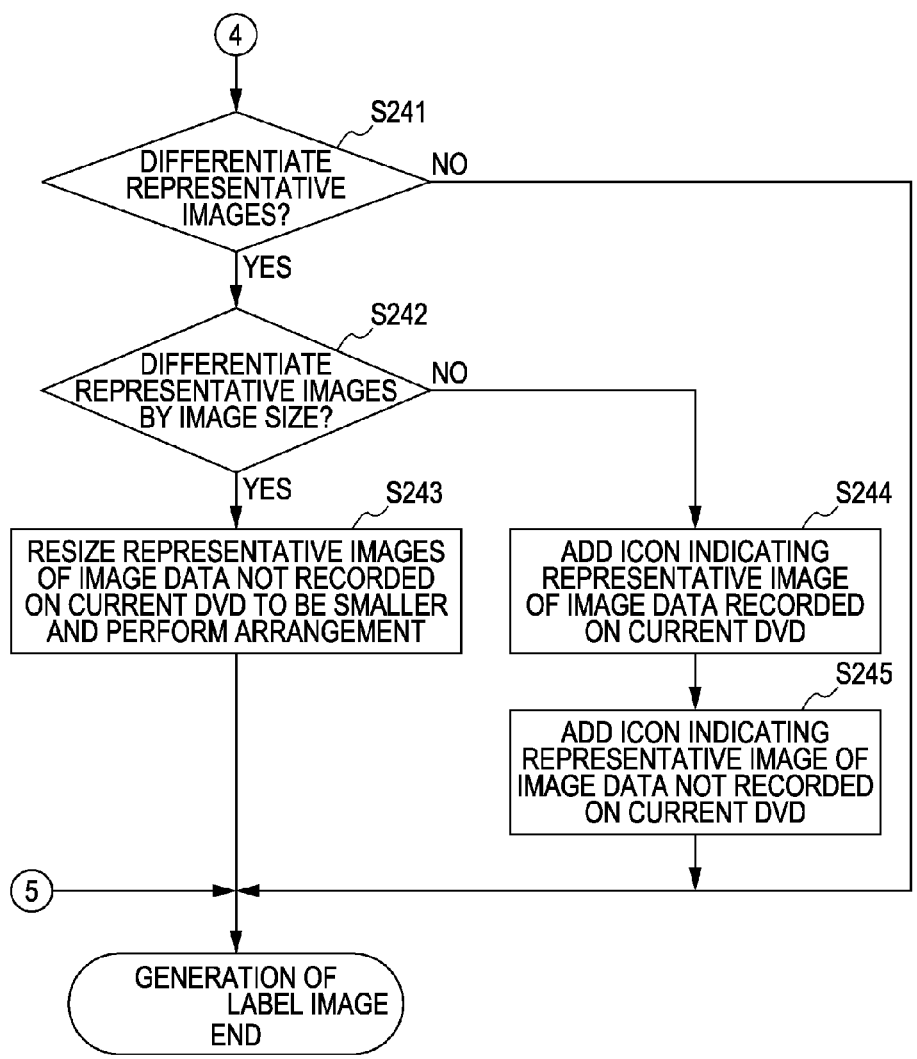
FIG. 2E is a flowchart showing the first embodiment and illustrating the exemplary processing procedure of the still-image generation apparatus for realizing the still-image generation method.
Figure 3:
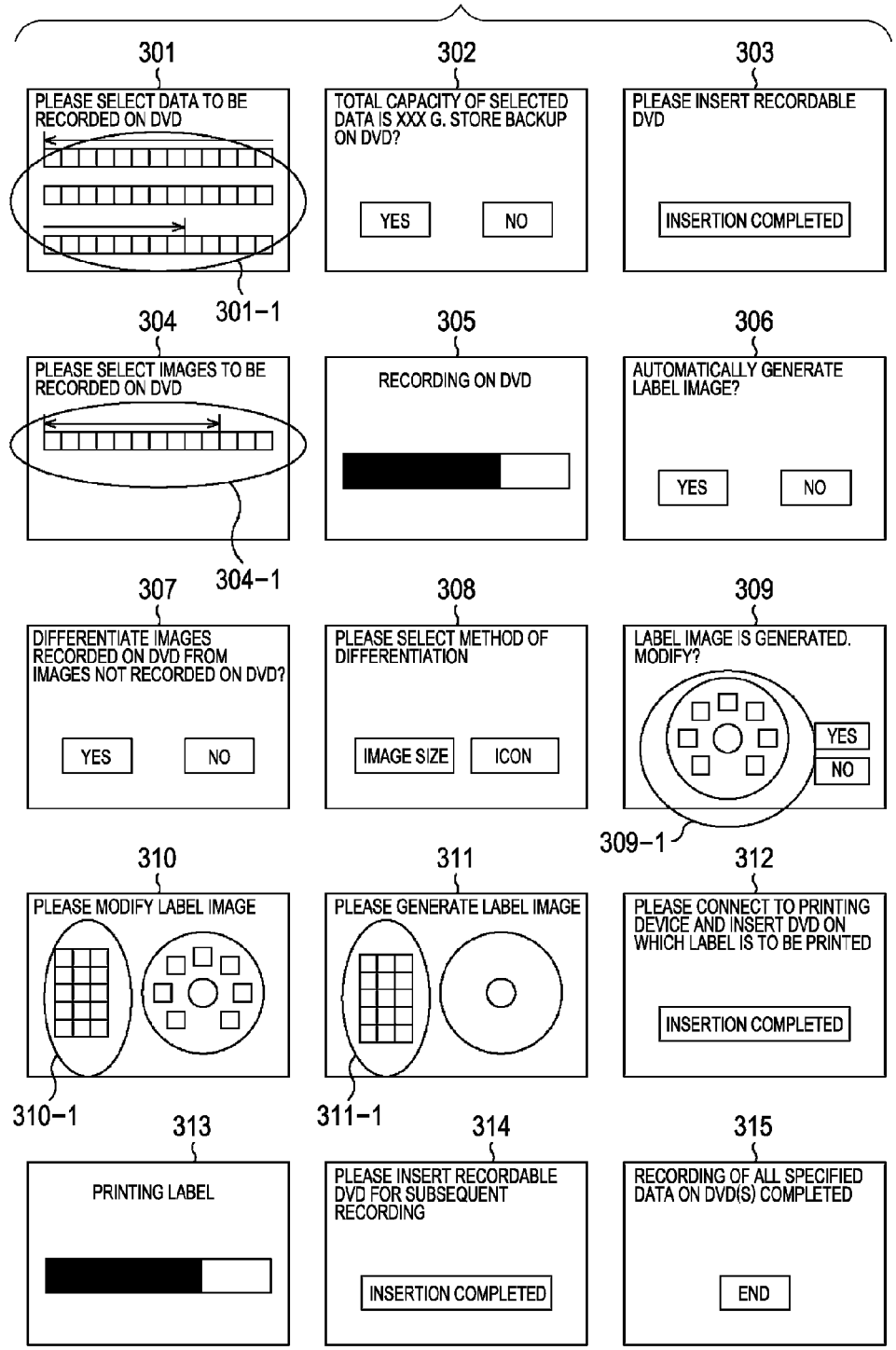
FIG. 3 is a diagram showing the first embodiment and illustrating part of a UI of the still-image generation apparatus for realizing the still-image generation method realized in FIG. 1.

FIG. 3 is a diagram illustrating part of a user interface (UI) described using the flowcharts of FIGS. 2A through 2E. In FIG. 3, 301 denotes a UI corresponding to step S201. As in an area denoted by 301-1 (the oval line is not actually displayed), the representative images of image data within the HDD 104 are shown, and a user is allowed to specify the range of image data to be recorded on a DVD/DVDs from the HDD 104.

In FIG. 3, 302 denotes a UI corresponding to step S204, 303 denotes a UI corresponding to step S207, and 304 denotes a UI corresponding to step S208. As in an area denoted by 304-1 (the oval line is not actually displayed), representative images of the image data recordable on a DVD are displayed, and a user is allowed to specify the range of a group of image data to be recorded on the DVD.

In FIG. 3, 305 denotes a UI corresponding to step S209, 306 denotes a UI corresponding to step S217, 307 denotes a UI corresponding to step S241, 308 denotes a UI corresponding to step S242, and 309 denotes a UI corresponding to step S219. As in an area denoted by 309-1 (the oval line is not actually displayed), the label image in the label-image area of the RAM 105 is displayed.

In FIG. 3, 310 denotes a UI corresponding to step S220. As in an area denoted by 310-1 (the oval line is not actually displayed), the representative images of the image data stored in the label-image generation area of the RAM 105 are displayed together with the label image in the label-image area of the RAM 105. In FIG. 3, 311 denotes a UI corresponding to steps S221 and S222. As in an area denoted by 311-1 (the oval line is not actually displayed), the representative images of the image data stored in the label-image generation area of the RAM 105 are displayed.

In FIG. 3, 312 denotes a UI corresponding to step S224, 313 denotes a UI corresponding to step S225, 314 denotes a UI when NO is selected in step S227, and 315 denotes a UI when YES is selected in step S314. In FIG. 3, 315 denotes an exemplary image displayed when the specified data has been recorded on a DVD/DVDs.

Figure 4:
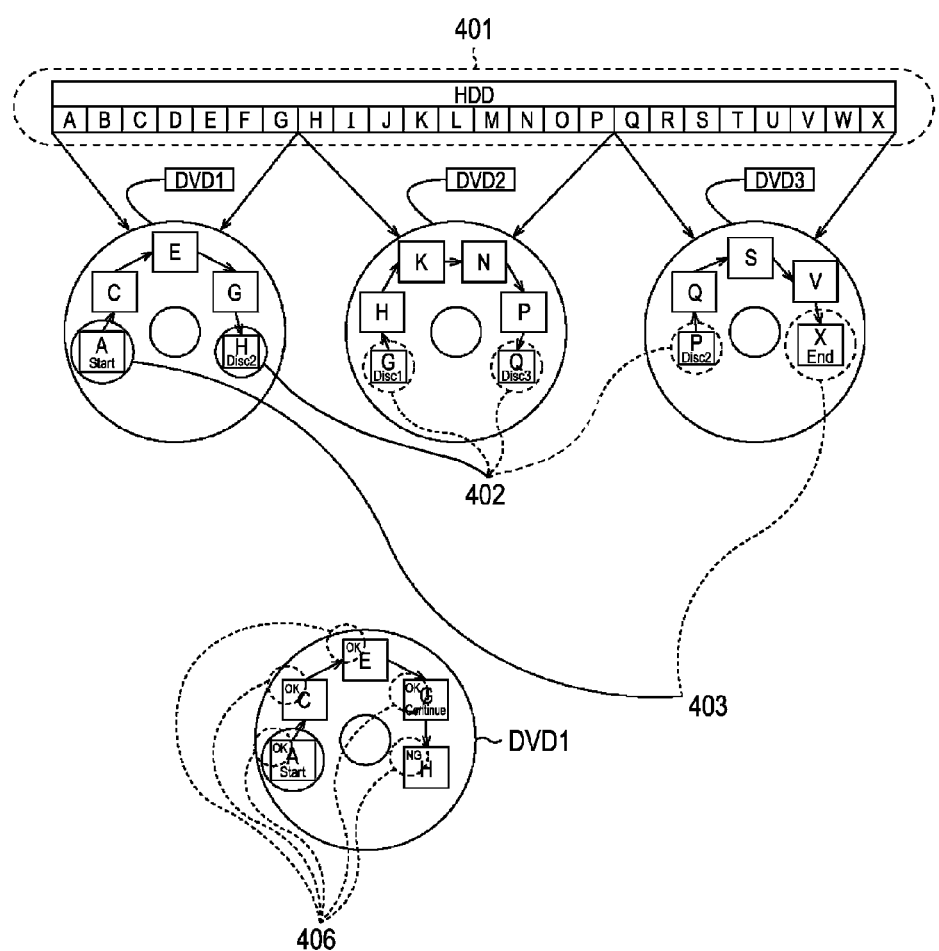
FIG. 4 is a diagram showing the first embodiment and showing exemplary label surfaces of DVDs generated by the still-image generation apparatus.

FIG. 4 is a diagram showing exemplary label surfaces of DVDs generated by the still-image generation apparatus of FIG. 1. In FIG. 4, 401 denotes that items of image data A through X are recorded in the HDD 104. When the group of the image data within the HDD 104 is divided for a DVD 1 through a DVD 3 and recorded thereon, an example of divided data and exemplary label surfaces of DVDs will be described below.

The items of the image data A through G in the HDD 104 are recorded on the DVD 1. The items of the image data H through P in the HDD 104 are recorded on the DVD 2. The items of the image data Q through X in the HDD 104 are recorded on the DVD 3. In this example, all of the items of the image data within the HDD 104 are recorded; however, part of the items of the image data in the HDD 104 may be recorded on DVDs.

Here, the representative images recorded on the surface of Disc 1 are generated from not only the items of the image data A through G but also the item of the image data H that is the first item of the image data on Disc 2, which is the next disc. Moreover, the representative images recorded on the surface of the Disc 2 are generated from not only the items of the image data H through P but also the item of the image data G that is the last item of the image data on the Disc 1, which is the previous disc, and the item of the image data Q that is the first item of the image data on Disc 3, which is the next disc.

Moreover, the representative images recorded on the surface of the Disc 3 are generated from not only the items of the image data Q through X but also the item of the image data P that is the last item of the image data on the Disc 2, which is the previous disc. As a matter of course, the image data may be moving-image data or may be still-image data. The items of the image data A through X recorded on the HDD 104 may be individual items of data, or they may be items of data obtained by dividing moving-image data. The present invention can be applied to either case.

For example, as denoted by 402 on the DVD 2, representative images corresponding to the items of the image data recorded on the DVDs before and after the DVD 2 (in this example, the DVD 1 and DVD 3) are printed on the label surface of the DVD 2 together with the representative images of the image data recorded on the DVD 2.

More specifically, the first representative image printed or recorded on the DVD 2 is a representative image generated from the last portion of the data recorded on the DVD 1, which is the previous recording medium. Here, the "representative image generated from the last portion of the data" indicates that the representative image does not have to be generated from the perfectly last data recorded on the DVD 1, as long as the image data corresponding to almost the last portion of the data recorded on the DVD 1 can be recognized. As a matter of course, the perfectly last image (the last frame in the case of a moving image) may be used but not limited thereto.

Moreover, the last representative image printed or recorded on the DVD 2 is a representative image generated from the initial portion of the data recorded on the DVD 3, which is the next recording medium. Here, the "representative image generated from the initial portion of the data" indicates that the representative image does not have to be generated from the perfectly initial data recorded on the DVD 3, as long as the image data corresponding to almost the initial portion of the data recorded on the DVD 3 can be recognized. As a matter of course, the perfectly first image (the first frame in the case of a moving image) may be used but not limited thereto.

Moreover, as denoted by 402, display of the previous DVD number or the next DVD number (for example, Disc 1 or Disc 3) clearly shows that the previous DVD or the next DVD exists. As denoted by 403, addition of an icon indicating the start of the image data such as "Start" to the first representative image of all representative images shows that the initial data is recorded on the DVD having the icon. Moreover, addition of an icon of "End" to the last representative image of all the representative images shows that the last data is recorded on the DVD having the icon.

As described above, the information added to a representative image is not limited to the ones described in the first embodiment. Specific information such as different characters or marks may be applied, as long as the information is provided in such a manner that the very first representative image, the existence of the previous or next disc, or the like can be easily recognized by a user.

Moreover, if YES is selected in step S242 in FIG. 2E, as shown in FIG. 4, on a subject recording medium, the representative images of the image data recorded on the subject recording medium are set to be larger than the representative images of the image data recorded on other recording media such as the items of the image data H, G, Q, and P denoted by 402.

Moreover, if NO is selected in step S242 in FIG. 2E, as denoted by 406, an icon ("OK" mark) indicating that the image data corresponding to a subject representative image is recorded on a subject DVD is displayed on the representative images whose corresponding image data is recorded on a subject DVD. Then, an icon ("NG" mark) indicating that the image data corresponding to a subject representative image is not recorded on a subject DVD is displayed on the representative images whose corresponding image data is not recorded on a subject DVD.

Here, the first embodiment can also be realized as an application of PCs by using the microcomputer 101 as a CPU, the LCD 102 as a display, the operation unit 103 as a mouse and a keyboard, the MPEG circuit 107 as a MPEG software encoder/decoder, the JPEG circuit 108 as a JPEG software encoder/decoder, and the image processing circuit 109 as an image processing software program in FIG. 1.

Here, division standards in the case where data is divided for a plurality of media may be based not only on the capacity of data but also on classification according to property information such as the date, the title, and scene information. Moreover, positions at which division is performed may be manually specified.

Figure 5:
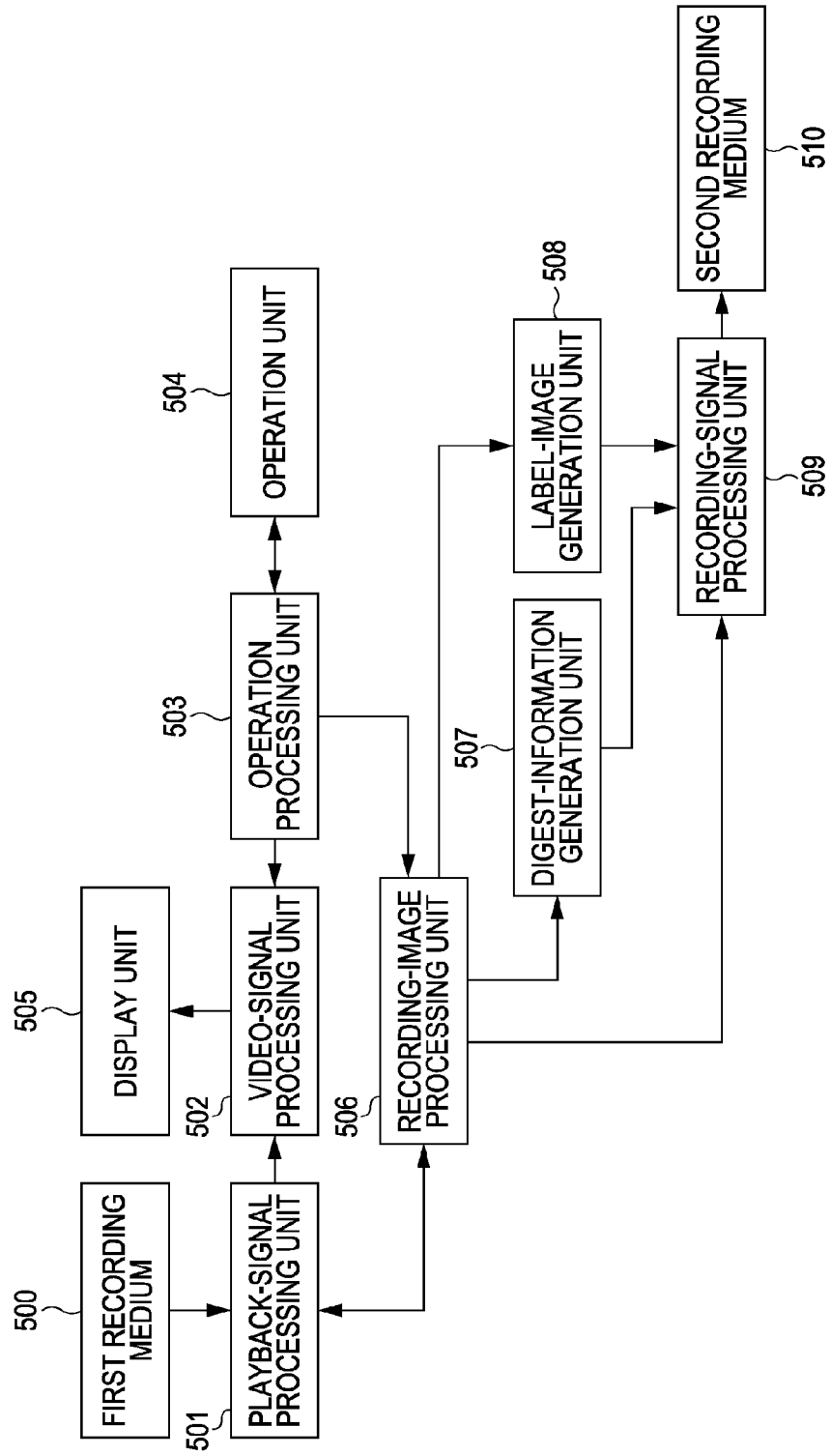
FIG. 5 is a block diagram showing a second embodiment and showing a main part of a recording apparatus.

FIG. 5 shows a block diagram of a recording apparatus for realizing a second embodiment. In FIG. 5, a first recording medium 500 is a recording medium capable of storing data of large capacity, and a plurality of image files can be stored on the first recording medium 500. A playback-signal processing unit 501 decodes image files stored on the first recording medium 500 and performs error correction on the decoded image files. A video-signal processing unit 502 generates an image to be played back (hereinafter referred to as a playback image) from a decoded signal, and displays the playback image on a display unit 505.

An operation unit 504 is an operation unit with which a user performs operation. An operation processing unit 503 performs processing regarding a user's operation. A recording-image processing unit 506 is a processing unit that selects an image file/files to be dubbed in response to a user's operation and divides the image file/files. The recording-image processing unit 506 selects part of the data of large capacity stored in the first recording medium 500 as a second group of image data, and performs division processing on the second group of the image data into recording units of data having an order.

A digest-information generation unit 507 generates digest information regarding an image/images to be dubbed. In the case of a moving image, the digest information generated by the digest-information generation unit 507 is, for example, data obtained by extracting items of data at predetermined time intervals from information to be recorded on a subject medium and connecting the items of the data. Moreover, after scene detection is performed, items of data, each of which is data for a few seconds and is obtained from the beginning of one of the detected scenes, may be connected. In the case of still images, when still images are arranged in the order of file name or time, still images may be extracted at predetermined intervals. Still images may be randomly extracted.

A label-image generation unit 508 generates a label image for a recording medium, such as a DVD-R, on which an image/images to be dubbed is/are recorded. A recording-signal processing unit 509 receives an image/images to be dubbed, digest information, and a label image. Then, the recording-signal processing unit 509 adds error-correcting code to the image/images to be dubbed, digest information, and label image and performs compression thereon, and records the compressed data on a second recording medium 510, which is removable, such as a DVD-R.

Here, the recording-signal processing unit 509 will be described on the premise that the recording-signal processing unit 509 has a function of recording data on the second recording medium 510 and a function of printing a label image on the surface of the second recording medium 510. That is, both data to be recorded on a DVD-R and print data for printing a label on the surface of the DVD-R are input to the recording-signal processing unit 509. Then, when data to be recorded on the DVD-R is input, the recording-signal processing unit 509 records the data on the DVD-R using a data recording head, which is not shown. When print data for printing a label on the surface of the DVD-R is input, the recording-signal processing unit 509 controls a print head, which is not shown, and performs printing.

Data recording and print processing may be performed by communicating with a data recording apparatus serving as an external appliance or a printing device. In this case, communication should be performed with each of a recording apparatus for recording data and a printer through a plurality of communication interfaces.

Prior to dubbing, a user causes a menu to be displayed through the operation unit 504, and can generate digest information regarding a group of content items to be dubbed at the time of dubbing and perform the setting as to whether the digest information is to be recorded for another group of content items.

Figure 6:
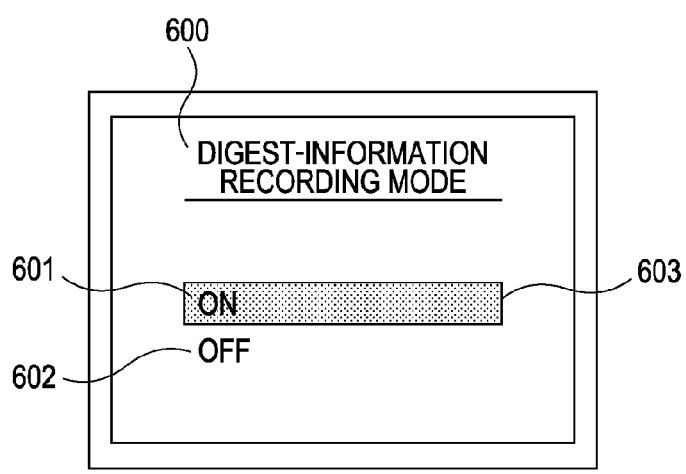
FIG. 6 is a diagram showing the second embodiment and illustrating an example of a setting screen regarding a digest-information recording mode.

FIG. 6 is an example of a setting screen for performing the setting as to whether this digest information is to be generated and recorded. When a user selects the setting of a digest-information recording mode from the menu, "digest-information recording mode" denoted by 600 is displayed on the display unit 505, and "ON" denoted by 601 for turning on the digest-information recording mode and "OFF" denoted by 602 for turning off the digest-information recording mode are displayed. In FIG. 6, 603 denotes a selection cursor, and a user can control the selection cursor through the operation unit 504 and select the setting of the digest-information recording mode.

Next, the way in which the digest information regarding a group of content items to be dubbed is generated at the time of dubbing and the digest information is recorded for another group of content items will be described using flowcharts of FIGS. 7A and 7B.

First, in step S700, when a request for switching to a dubbing mode is detected, the switching request being obtained through a user operation, the procedure proceeds to step S701. In step S701, the mode is switched to the dubbing mode.

Next, in step S702, image files recorded on the first recording medium 500 are displayed in a list format on the display unit 505, and a user is allowed to select which image/images is/are to be dubbed through the operation unit 504.

Figure 8:
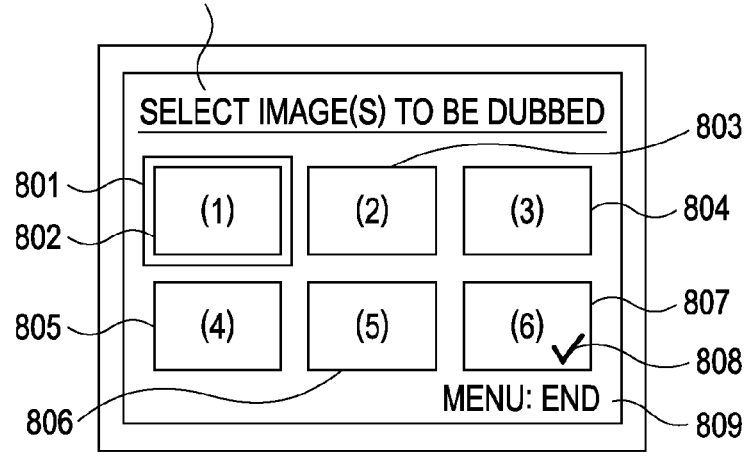
FIG. 8 is diagram showing the second embodiment and showing an example of a screen for selecting an image to be dubbed.

An exemplary screen for selecting an image/images to be dubbed is shown in FIG. 8. In FIG. 8, "select image(s) to be dubbed" denoted by 800 is displayed on the display unit 505 and content items denoted by 802 through 807 that are recorded on the first recording medium 500 are displayed in a list format. In FIG. 8, 801 denotes a selection cursor, and a user is allowed to select an image/images to be dubbed by operating a cursor 801 through the operation unit 504. In FIG. 8, 808 denotes a mark indicating that a subject image has been selected to be dubbed, and 809 indicates that when a menu button is pressed, selection of an image/images to be dubbed will be finished.

Steps S703 and S704 are repeatedly performed until when a user finishes selecting an image/images to be dubbed. When the information indicating that the user has finished selecting an image/images to be dubbed is input, the procedure proceeds to step S705.

In step S705, a capacity selection screen which is a screen for selecting the capacity of a medium on which recording is to be performed is displayed on the display unit 505, and a user is allowed to select a capacity using the operation unit 504. An example of the capacity selection screen for selecting the capacity of a medium on which recording is to be performed is shown in FIGS. 9 and 10.

Figure 9:
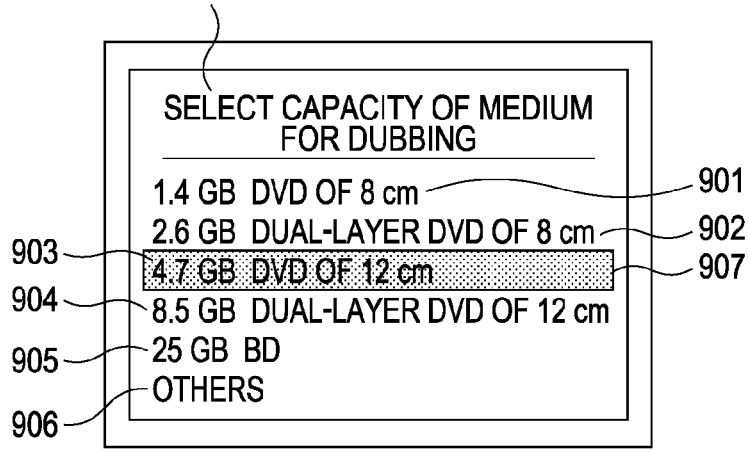
FIG. 9 is a diagram showing the second embodiment and showing an example of a selection screen regarding the capacity of a medium on which recording is to be performed.

In FIG. 9, "select capacity of medium for dubbing" denoted by 900 is displayed on the display unit 505, and a menu including the capacity of media denoted by 901 through 905 on which recording can be performed is displayed. In FIG. 9, 907 denotes a selection cursor and a user operates the selection cursor 907 through the operation unit 504 and selects the capacity of a medium on which recording is to be performed. When "others" denoted by 906 is selected on this selection screen, the selection screen is changed to a screen shown in FIG. 10, "input capacity of medium on which recording is to be performed" denoted by 1010 is displayed on the display unit 505, and a user can arbitrarily input the capacity of a medium on which recording is to be performed as denoted by 1011 using the operation unit 504. When "return" denoted by 1012 is selected, the screen returns to the selection screen shown in FIG. 9, and when "end" denoted by 1013 is selected, input of the capacity of a medium on which recording is to be performed is finished.

Steps S706 and S707 are repeatedly performed until when a user finishes selecting the capacity of a medium on which recording is to be performed. When a user selects the capacity of a medium on which recording is to be performed, the procedure proceeds to step S708. Here, processing for allowing a user to select the capacity of a medium on which recording is to be performed is described as an example; however, processing of obtaining and setting the capacity of a medium on which recording is to be performed when the medium is inserted into an external recording apparatus may be used.

Figure 10:
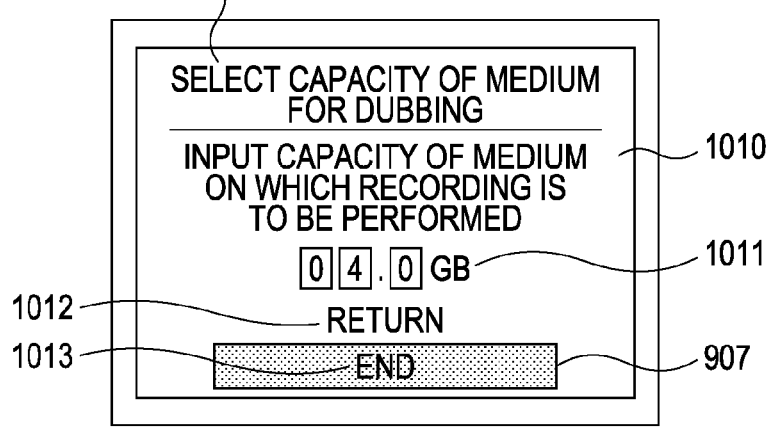
FIG. 10 is a diagram showing the second embodiment and showing an example of a selection screen regarding the capacity of a medium on which recording is to be performed.

Moreover, by providing a detection unit configured to detect the type and capacity of the second recording medium 510 in the recording-signal processing unit 509, the screens shown in FIGS. 9 and 10 can be omitted. Alternatively, as a default display state regarding the screens shown in FIGS. 9 and 10, the screens may be changed to a screen on which the type and capacity of a detected medium has been selected and which requests a user to perform confirmation.

In step S708, the total capacity of an image/images to be dubbed and the capacity of a medium on which recording is to be performed are compared. In step S709, it is checked whether the image/images to be dubbed can be contained in one medium on which recording is to be performed. If the image/images to be dubbed cannot be contained in one medium, the procedure proceeds to step S710. In contrast, if the image/images to be dubbed can be contained in one medium, the procedure proceeds to step S717, dubbing is performed on the second recording medium 510, and the procedure ends.

In step S710, a group of content items is generated by dividing the selected image/images so as to be containable in a medium on which recording is to be performed. An example of processing performed in step S710 will be specifically described using FIG. 11.

Figure 11:
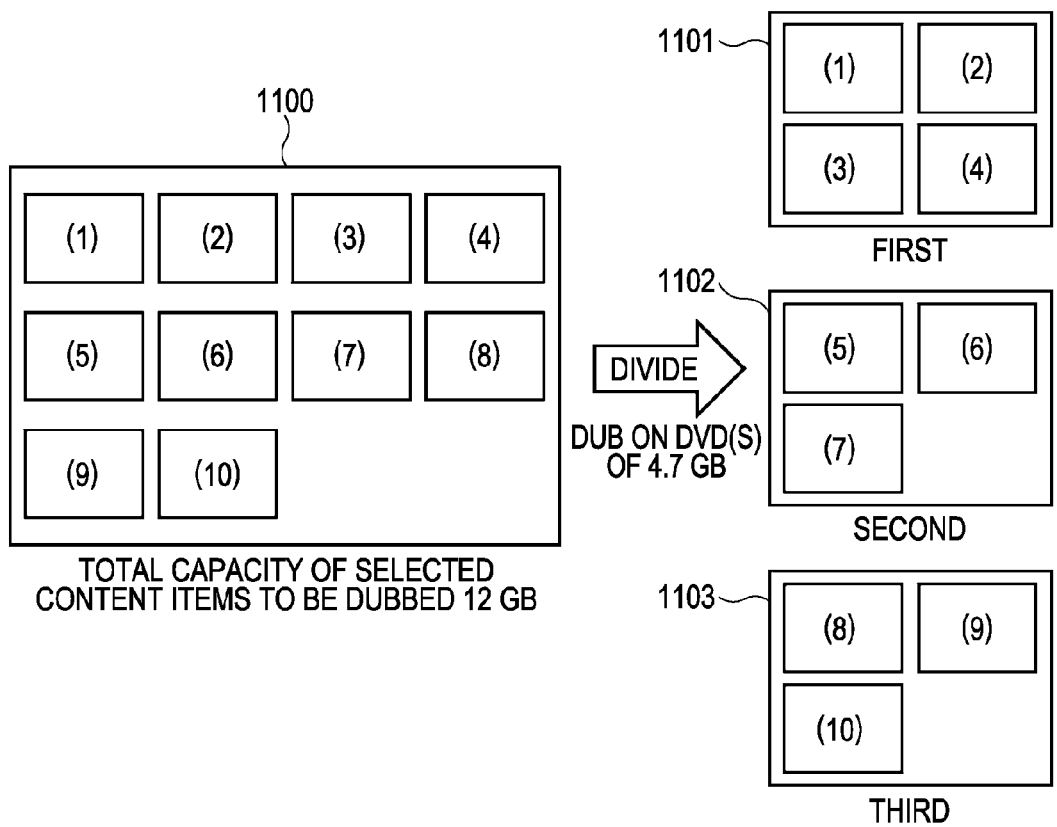
FIG. 11 is a diagram showing the second embodiment and illustrating a process in which selected images are divided to generate groups of content items so as to be contained in recording media on which recording is to be performed.

FIG. 11 shows a situation in which 10 content items are selected in processing in steps S702, S703, and S704 and the total capacity of the 10 content items denoted by 1100 is 12 GB. Moreover, 4.7 GB is selected as the capacity of a medium, a DVD, on which recording is to be performed, in processing in steps S705, S706, and S707.

Since data of 12 GB cannot be contained in one DVD, the data needs to be divided and dubbed on three DVDs in order to dub the 10 content items. Thus, the 10 content items, which are (1) through (10) chapters, are divided into three groups of content items. The (1) through (4) chapters are a group of content items 1101, which is the section of the data to be dubbed on the first disc. The (5) through (7) chapters are a group of content items 1102, which is the section of the data to be dubbed on the second disc. The (8) through (10) chapters are a group of content items 1103, which is the section of the data to be dubbed on the third disc. Here, information regarding which content item(s) should be dubbed on which disc is called "division information".

Next, the procedure proceeds to step S711. An image to be printed is generated using the representative-image generation-use data in units of a group of content items obtained as a result of division, that is, in units of a recording unit of data. Here, representative images are generated, each of which is a representative image for a corresponding one of the selected 10 content items. Label images are generated, each of which is a label image for a corresponding one of the three recording media on which the groups of content items obtained as a result of division are recorded. Each of the label images includes representative images which are arranged in accordance with time information of the content items and on each of which shows a number representing the order of recording on a recording medium is added.

Next, the procedure proceeds to step S712, digest information is generated for each of the groups of content items obtained as a result of division, using division information. Digest information is generated by generating files of JPEG format, each of the files being generated from an index image of each of the chapters and generating a so-called photo movie, in which still-image files including a label image generated in step S711 are played back by sequentially changing to one another every two to three seconds. Next, the procedure proceeds to step S713, a selection screen for selecting a group of content items to which the digest information is added and recorded is displayed on the display unit 505 and a user is allowed to select a group of content items using the operation unit 504.

Figure 12:
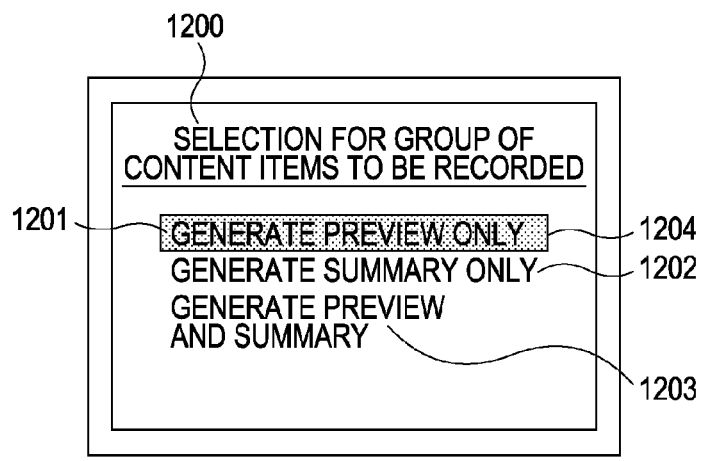
FIG. 12 is a diagram showing the second embodiment and showing an example of a selection screen.

FIG. 12 shows an exemplary selection screen. In FIG. 12, "selection for group(s) of content items to be recorded" denoted by 1200 will be displayed on the display unit 505, and a selection menu including items denoted by 1201 through 1203 is displayed. In FIG. 12, 1204 denotes a selection cursor, and a user operates the selection cursor 1204 through the operation unit 504 and selects a group/groups of content items to be recorded.

Figure 13A:
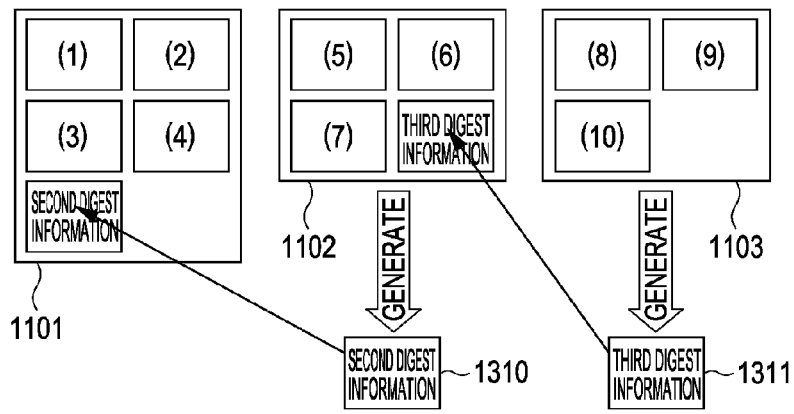
FIGS. 13A through 13C are diagrams showing the second embodiment and showing an example of recording of digest information.

For example, when "generate preview only" denoted by 1201 is selected, digest information 1310 regarding the second disc (hereinafter referred to as second-disc digest information 1310) is recorded on the first disc after a group of content items 1101 recorded on the first disc. Moreover, digest information 1311 regarding the third disc (hereinafter referred to as third-disc digest information 1311) is recorded on the second disc after a group of content items 1102 recorded on the second disc. In this way, the digest information regarding the n-th disc is added to the end of the n−1-th disc. FIG. 13A shows an example of recording in this case.

Figure 13B:
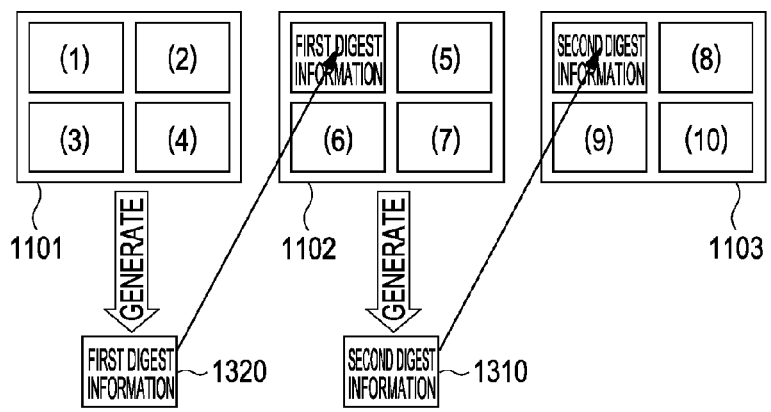

When "generate summary only" denoted by 1202 is selected, digest information 1320 regarding the first disc (hereinafter referred to as first-disc digest information 1320) is recorded on the second disc before the group of content items 1102 to be recorded on the second disc. Moreover, the second-disc digest information 1310 is recorded on the third disc before a group of content items 1103 to be recorded on the third disc. In this way, the digest information regarding the n-th disc is added to the beginning of the n+1-th disc. FIG. 13B shows an example of recording in this case.

Figure 13C:
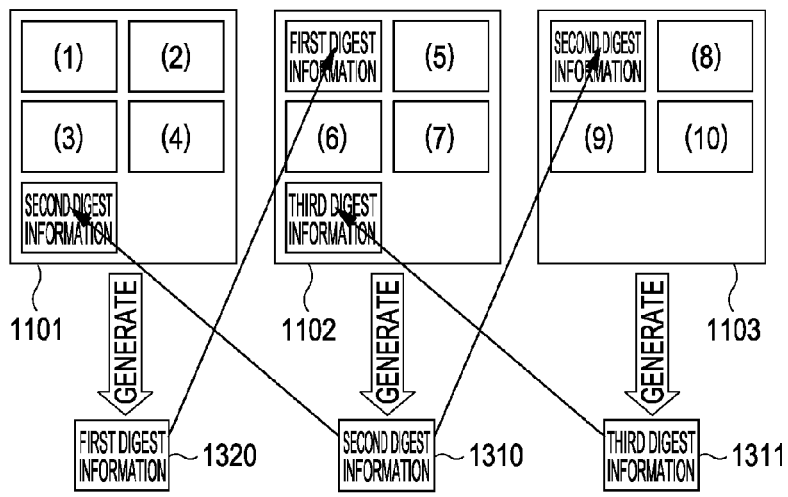

When "generate preview and summary" denoted by 1203 is selected, the digest information regarding the n-th disc is added after the group of content items recorded on the n−1-th disc and before the group of content items to be recorded on the n+1-th disc. FIG. 13C shows an example of recording in this case.

Steps S714 and S715 are repeatedly performed until when a user finishes selecting a group/groups of content items to which digest information is added. When a user finishes selecting a group/groups of content items to which digest information is added, the procedure proceeds to step S716.

In step S716, the digest information selected in step S714 is added. Thereafter, the procedure proceeds to step S717. In step S717, the information to be dubbed is recorded on the second recording medium 510.

Figure 14:
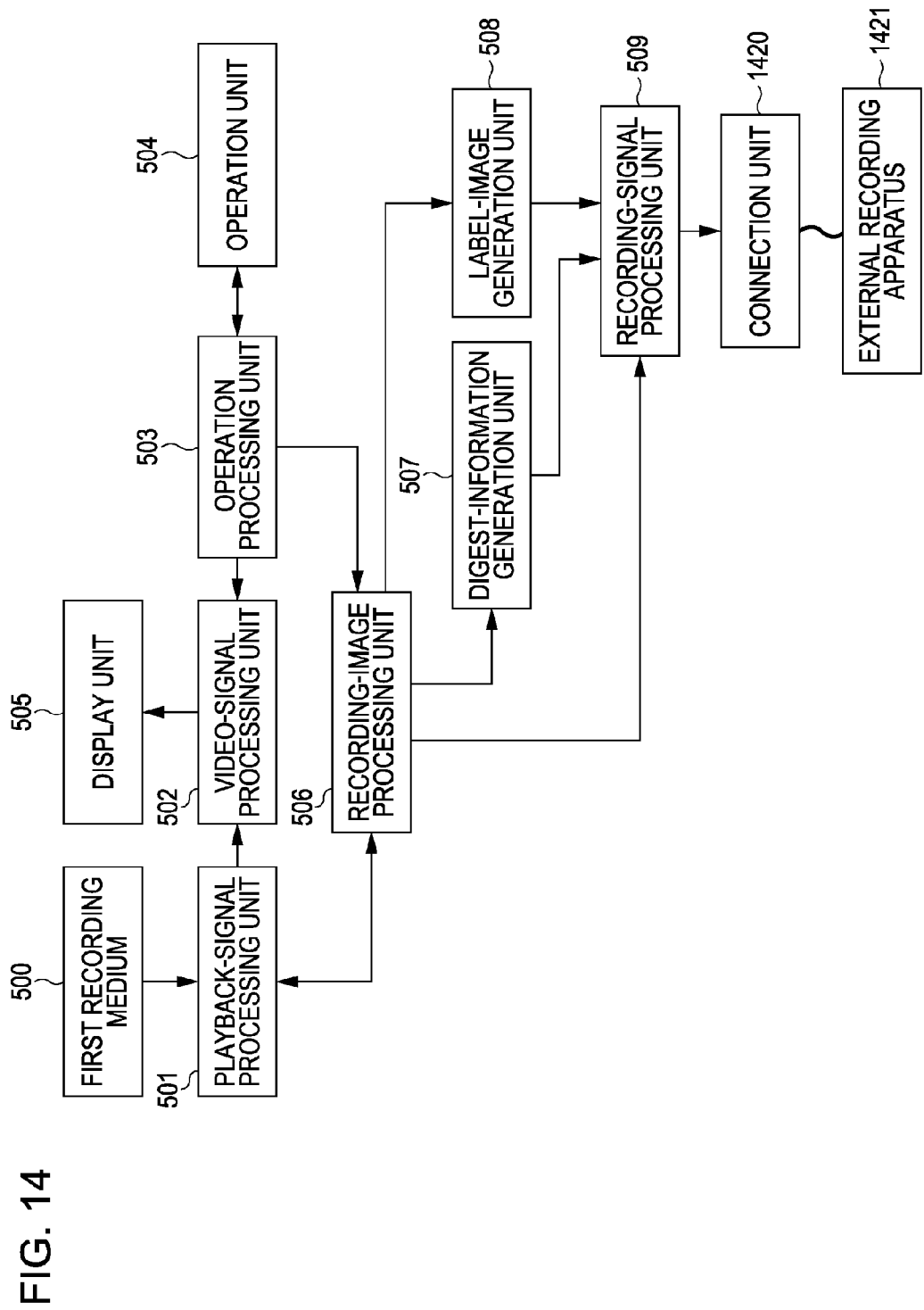
FIG. 14 is a block diagram showing a third embodiment and showing a main part of a recording apparatus.

FIG. 14 shows a block diagram of a recording apparatus for realizing a third embodiment. FIG. 14 is similar to the block diagram of FIG. 5 described in the second embodiment, except that the second recording medium 510 is replaced with a connection unit 1420 for connection with an external recording apparatus 1421.

In the third embodiment, similarly to the second embodiment, a user causes a menu to be displayed through the operation unit 504 prior to dubbing and generates digest information regarding a group of content items to be dubbed at the time of dubbing. Then, the setting as to whether the digest information is to be recorded for another group of content items relating to the group of content items can be performed.

Figure 15A:
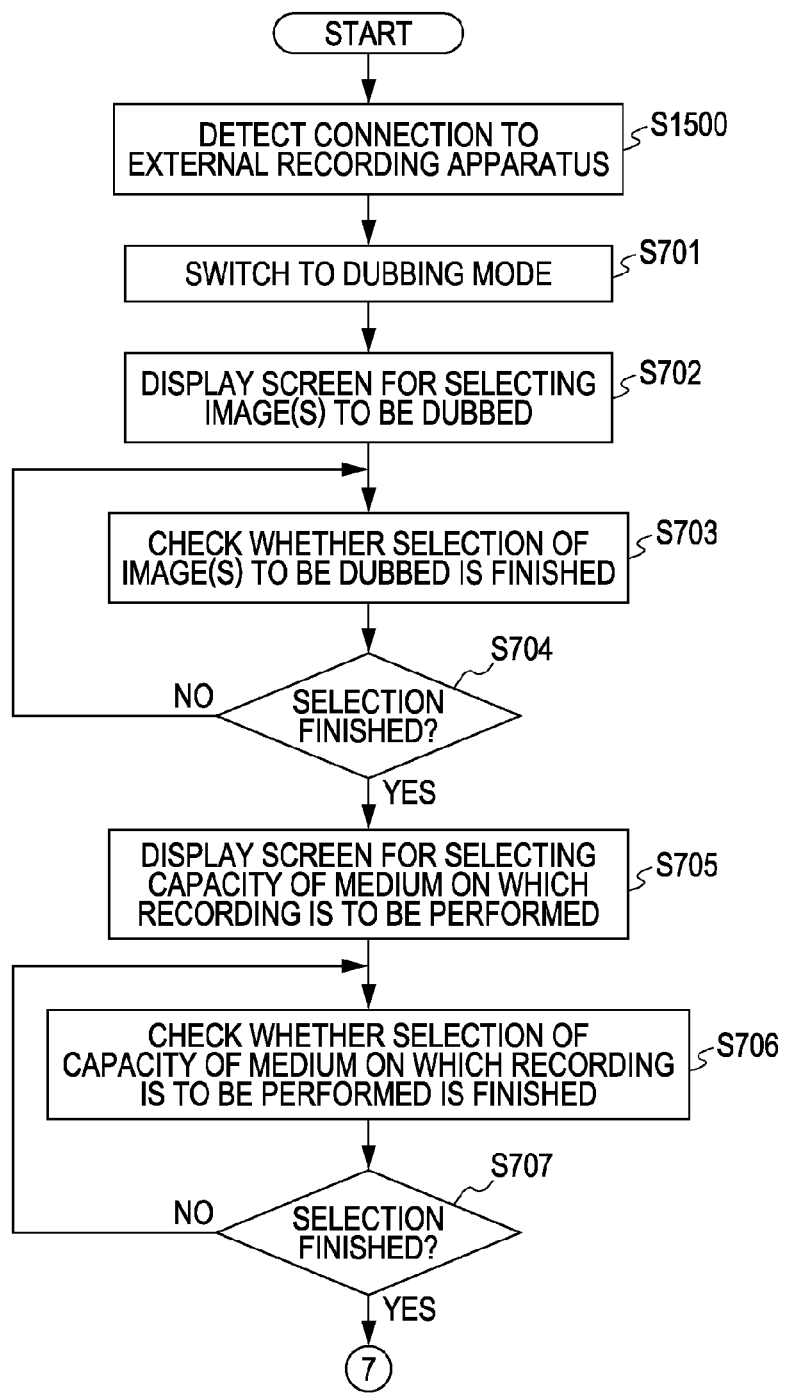
FIG. 15A is a flowchart showing the third embodiment and illustrating a procedure in which digest information regarding a group of content items to be dubbed is generated at the time of dubbing and the digest information is recorded for another group of content items.

Here, using a flowchart of FIGS. 15A and 15B, control of generating digest information regarding a group of content items to be dubbed at the time of dubbing and control of recording the digest information for another group of content items relating to the group of content items will be described. The flowchart of FIGS. 15A and 15B is similar to the flowchart of FIGS. 7A and 7B described in the second embodiment, except that step S700 is replaced with step S1500 and step S717 is replaced with step S1501.

In step S1500, when the connection unit 1420 detects that the external recording apparatus 1421 is connected, authentication is performed regarding the external recording apparatus 1421 and a connection is established. When the connection with the external recording apparatus 1421 is established, the procedure proceeds to step S701. Steps S701 through S716 are the same as those described in the second embodiment. In step S1501, information to be dubbed is sent to the external recording apparatus 1421.

As described above, according to the disclosure of the present application, when a unified group of image data is divided into strings of image data, representative images are generated for the strings of image data obtained as a result of division and a relationship between the strings of image data is displayed on representative images of the strings of image data. Thus, a user can easily recognize the relationship between the strings of data obtained as a result of division.

The units constituting a recording apparatus in the above-described embodiments can be realized by executing a program stored in a RAM or ROM of a computer. This program and a computer-readable recording medium (computer-readable storage medium) on which the program is recorded are included within the scope of the invention.

Moreover, the present invention can include, for example, embodiments of a system, an apparatus, a method, a program, a recording medium, and the like. More specifically, the present invention may be applied to a system constituted by a plurality of devices or may be applied to an apparatus constituted by a single device.

Here, the present invention can directly or remotely provide a software program that can execute steps of the above-described recording methods (a program corresponding to the flowcharts shown in FIGS. 2A through 2E, FIGS. 7A and 7B, and FIGS. 15A and 15B) to a system or an apparatus. Then, a case in which the present invention is realized by executing program code of the program supplied to the system or a computer of the apparatus is also within the scope of the invention.

Thus, the program code installed in a computer in order to realize functional processing of the present invention using the computer can realize the present invention. That is, a computer program for realizing functional processing of the present invention is also within the scope of the invention.

In this case, a computer program may be in the form of object code, a program that can be executed by an interpreter, script data supplied to an OS, or the like, as long as functioning as a program.

Various recording media can each be used as a recording medium for supplying a program. Examples of the various recording media include a floppy disk, a hard disk, an optical disc, a magneto-optical (MO) disk, a CD-ROM, a CD-R, a CD-RW, a magnetic tape, a nonvolatile memory card, a ROM, DVDs (a DVD-ROM and a DVD-R), and the like.

Furthermore, as a method of supplying a program, a homepage in the Internet is accessed through a browser of a client computer. Then, a computer program of the present invention or a file including a compressed computer program of the present invention with an auto-install function may be supplied by being downloaded from the homepage onto a recording medium such as a hard disk or the like.

Moreover, the program code constituting the program of the present invention is divided into a plurality of files and supply of the program of the present invention may be realized by downloading each of the files from a corresponding one of different homepages. That is, a world-wide web (WWW) server that allows a plurality of users to download the program files for realizing function processing of the present invention is also within the scope of the invention.

Moreover, when a program of the present invention is encrypted, stored in a recording medium such as a CD-ROM, and distributed to users, a user who satisfies a predetermined condition is allowed to download, from a homepage via the Internet, key information for decrypting the encrypted program. Supply of the program of the present invention may be realized by executing and installing, in a computer, the program obtained by decrypting the encrypted program using the key information.

Moreover, functions of the above-described embodiments may be realized by a read program being executed by a computer and also realized by part or all of actual processing being performed by an OS running in a computer.

Furthermore, a program read from a recording medium is written into a function expansion board inserted into a computer or a memory provided in a feature expansion unit connected to the computer. Thereafter, a CPU or the like provided in the function expansion board or the function expansion unit performs part or all of actual processing in accordance with an instruction supplied from the program. Functions of the above-described embodiments may also be realized by this processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-070402 filed Mar. 18, 2008, which is hereby incorporated by reference herein in its entirety.

What is claimed is:

1. An information processing apparatus comprising:
a dividing unit configured to divide data and generate sections of the data in order to record the data on a plurality of recording media, the sections having an order;
a representative-image generation unit configured to generate representative images for each of the recording media, on which the sections of the data are recorded; and
a print-data generation unit configured to generate print data to be printed on a surface of a certain recording medium using the representative images generated by the representative-image generation unit,
wherein the representative images are generated from the partial data recorded on a certain recording medium which is at least either of foregoing partial data which is not recorded on the certain recording medium but recorded on the foregoing recording medium, or of following partial data which is not recorded on the certain recording medium but recorded on the following recording medium.

2. The information processing apparatus according to claim 1, further comprising:
a print unit configured to perform printing on the surface of the recording medium using the print data generated by the print-data generation unit.

3. The information processing apparatus according to claim 1, further comprising:
a recording unit configured to record the sections of the data, each of which is recorded on a corresponding one of the recording media.

4. The information processing apparatus according to claim 1,
wherein the data is divided in accordance with time information and the sections of data obtained as a result of the division have an order based on the time information.

5. The information processing apparatus according to claim 1,
wherein representative images generated using the previous section of the data and the next section of the data are generated from data obtained from the previous section of the data and having the time information closest to that of the section of the data to be recorded on the certain recording medium and data obtained from the next section of the data and having the time information closest to that of the section of the data to be recorded on the certain recording medium.

6. The information processing apparatus according to claim 1,
wherein information indicating a recording medium on which the previous section of the data is to be recorded is added to a representative image generated from the previous section of the data and information indicating a recording medium on which the next section of the data is to be recorded is added to a representative image generated from the next section of the data.

7. The information processing apparatus according to claim 1,
wherein specific information is added to the first representative image and the last representative image from among all representative images.

8. An information processing method comprising:
a dividing step of dividing data and generating a plurality of sections of the data for recording the data on a plurality of recording media, the sections having an order;

a representative-image generation step of generating representative images for each of the recording media on which the sections of the data are recorded; and a print-data generation step of generating print data to be printed on a surface of a certain recording medium using the representative images generated in the representative-image generation step, wherein the representative images are generated from the partial data recorded on a certain recording medium which is at least either of foregoing partial data which is not recorded on the certain recording medium but recorded on the foregoing recording medium, or of following partial data which is not recorded on the certain recording medium but recorded on the following recording medium.

9. The information processing method according to claim 8, further comprising:

a print step of performing printing on the surface of the recording medium using the print data generated in the print-data generation step.

10. The information processing method according to claim 8, further comprising:

a recording step of recording the sections of the data, each of which is recorded on a corresponding one of the recording media.

11. The information processing method according to claim 8, wherein the data is divided in accordance with time information and the sections of data obtained as a result of the division have an order based on the time information.

12. The information processing method according to claim 8, wherein representative images generated using the previous section of the data and the next section of the data are generated from data obtained from the previous section of the data and having the time information closest to that of the section of the data to be recorded on the certain recording medium and data obtained from the next section of the data and having the time information closest to that of the section of the data to be recorded on the certain recording medium.

13. The information processing method according to claim 8, wherein information indicating a recording medium on which the previous section of the data is to be recorded is added to a representative image generated from the previous section of the data and information indicating a recording medium on which the next section of the data is to be recorded is added to a representative image generated from the next section of the data.

14. The information processing method according to claim 8, wherein specific information is added to the first representative image and the last representative image from among all representative images.

15. A non-transitory computer-readable storage medium storing a program for controlling a computer to perform the information processing method according to claim 8.

* * * * *